United States Patent
Sarma et al.

(10) Patent No.: US 6,171,364 B1
(45) Date of Patent: *Jan. 9, 2001

(54) METHOD FOR STABLE OPERATION OF A SMELTER REACTOR

(75) Inventors: Balu Sarma, Airmont, NY (US); Kenneth B. Downing, Greenville, SC (US)

(73) Assignee: Steel Technology Corporation, Washington, DC (US)

( * ) Notice: Under 35 U.S.C. 154(b), the term of this patent shall be extended for 0 days.

This patent is subject to a terminal disclaimer.

(21) Appl. No.: 08/821,445

(22) Filed: Mar. 21, 1997

Related U.S. Application Data

(60) Provisional application No. 60/013,860, filed on Mar. 22, 1996.

(51) Int. Cl.[7] .................................................. C21B 15/00

(52) U.S. Cl. ................................ 75/382; 75/384; 75/385; 75/386; 75/387; 75/501; 75/502

(58) Field of Search ............................. 75/382, 384, 385, 75/386, 387, 501, 502

(56) References Cited

U.S. PATENT DOCUMENTS

| | | |
|---|---|---|
| 3,181,343 | 5/1965 | Fillon ........................................ 73/23 |
| 3,377,158 | 4/1968 | Meyer et al. ............................. 75/60 |
| 3,561,743 | 2/1971 | Schroeder ............................... 266/35 |
| 3,719,811 | 3/1973 | Munson ........................... 235/151.12 |

(List continued on next page.)

FOREIGN PATENT DOCUMENTS

| | | |
|---|---|---|
| 0007856 | 2/1980 | (EP) . |
| 0084288 | 7/1983 | (EP) . |
| 0320999 | 6/1989 | (EP) . |

(List continued on next page.)

OTHER PUBLICATIONS

"Recent Practical Achievements on the AISI Direct Smelting of Steel Plant Waste Oxide", William Dennis, American Iron and Steel Institute, Gorham COnference in Atlanta, Mar. 22, 1995.

"Investigation on the Effect of Zn on the Behavior of S in the Iron Bath Smelting Reduction Process", Hong jia Li and Masanni Tokuda, Steel Research 64 (1993) No. 1, p. 39, Month Unavailable.

(List continued on next page.)

*Primary Examiner*—Melvyn Andrews
(74) *Attorney, Agent, or Firm*—Fitzpatrick, Cella, Harper & Scinto

(57) ABSTRACT

A process of producing molten iron involves:
  a) introducing iron oxide, flux, oxygen, nitrogen, carbon, and hydrogen to a smelter reactor;
  b) maintaining conditions to cause (i) the iron oxide to be reduced, (ii) molten iron to be created and stirred in the bottom of the reactor, surmounted by a layer of foaming, FeO-containing slag, and (iii) carbon monoxide gas to rise through the slag;
  c) causing at least some of the carbon monoxide to react with the oxygen;
  d) releasing an offgas containing CO, $CO_2$, $H_2$, and $H_2O$; and
  e) removing at least some of the molten iron and slag from the reactor. Good process stability is achieved by:
  f) repeatedly measuring, during the process, the conditions of the slag height, the temperature of the molten iron, the levels of CO, $CO_2$, $H_2$, and $H_2O$ in the offgas, the carbon level in the molten iron, and the FeO level in the slag, and
  g) subsequently adjusting one or more process variables (e.g., a reactant feed rate, the iron bath stirring rate, or the height of the oxygen lance above the slag) so as to help keep one or more of those process conditions within a predetermined range.

26 Claims, 26 Drawing Sheets

U.S. PATENT DOCUMENTS

| | | | |
|---|---|---|---|
| 3,779,744 | 12/1973 | Matteson et al. ........................ 75/60 |
| 3,820,768 | 6/1974 | Sieckman et al. ..................... 266/35 |
| 3,871,871 | 3/1975 | Denis et al. ............................. 75/60 |
| 4,150,973 | 4/1979 | Sanuki et al. ............................ 75/60 |
| 4,345,746 | 8/1982 | Schleimer et al. ..................... 266/90 |
| 4,469,510 | * 9/1984 | Metz et al. ............................. 75/501 |
| 4,474,361 | 10/1984 | Kanemoto et al. .................... 266/96 |
| 4,504,311 | * 3/1985 | Weiner .................................. 75/382 |
| 4,668,285 | 5/1987 | Lebonvallet ............................. 75/41 |
| 4,976,780 | 12/1990 | Amano et al. ......................... 75/375 |
| 4,995,906 | 2/1991 | Iwasaki et al. ........................ 75/502 |
| 5,017,220 | 5/1991 | Tanabe et al. ......................... 75/629 |
| 5,074,530 | 12/1991 | Iwasaki et al. ...................... 266/157 |
| 5,078,785 | * 1/1992 | Ibaraki et al. ......................... 75/386 |
| 5,203,909 | 4/1993 | Petrushka et al. ..................... 75/375 |

FOREIGN PATENT DOCUMENTS

| | | |
|---|---|---|
| 0384395 | 8/1990 | (EP) . |
| 0418627 | 3/1991 | (EP) . |
| 686703A1 | 12/1995 | (EP) . |
| 690136A1 | 1/1996 | (EP) . |
| 726326A2 | 8/1996 | (EP) . |
| 735146A1 | 10/1996 | (EP) . |
| 1087027 | 10/1967 | (GB) . |
| 59-153848 | 9/1984 | (JP) . |
| 60-215705 | 10/1985 | (JP) . |
| 63-153206 | 6/1988 | (JP) . |
| 1-031910 | 2/1989 | (JP) . |
| 1-247517 | 10/1989 | (JP) . |
| 1-252710 | 10/1989 | (JP) . |
| 1-263211 | 10/1989 | (JP) . |
| 2-179809 | 7/1990 | (JP) . |
| 2-190412 | 7/1990 | (JP) . |
| 789619 | 12/1980 | (SU) . |

OTHER PUBLICATIONS

"Einschmelzen von eisenschamm oder schrott in einem stahlwerksgefass durch gleichzeitiges einblasen von feinkohle und sauerstoff", Dietrich Radke, Stahl Und Eisen Dusseldorf, DE, Apr. 1979, pp. 334–340.

T. Ibaraki, "Experimental Operation of Smelting Reduction With A 100 mt Smelter—1. Operation And the Slag in The Smelter," Transactions of the ISS 1, (pp. 83–90) (Mar. 1995).

S. Wakamatsu, "Influence of Coal Diameter on Gasification of Carbonaceous carry over Particles in SFR", CAMP–ISIJ vol. 8 (1995) (p. 899). w/English Translation.

M. Ishikawa, behavior of Post Combustion in DIOS Smelting Reduction Furnace, CAMP–ISIJ vol. 8 (1995) (p. 172). W/English Translation.

Keogh, "Hismelt Process Advances to 100,000 t/y Plant" Ironmaking Conf. Proc. (1991) (pp. 635–649).

Cusack, "Hismelt—$2^{nd}$ Generation Direct Smelting", European Ironmaking Conf. (1991).

* cited by examiner

METHOD FOR STABLE OPERATION OF A SMELTER REACTOR

This application claims the benefit of U.S. Provisional Application No. 60/013,860, filed Mar. 22, 1996.

BACKGROUND OF THE INVENTION

The present invention relates generally to improvements in methods of producing molten iron. More particularly, the invention concerns a method for stabilizing the operation of a post-combustion smelting process for producing hot, molten iron from iron ores and/or other iron-bearing oxides. The Government of the United States of America has rights in this invention pursuant to Cooperative Agreement No. DE-FC07-94ID13284, awarded by the U.S. Department of Energy.

Methods of producing iron by smelting reduction, utilizing post-combustion technology with iron ore and coal-based fuels, are well known in the art. In such processes, it is preferable to use process controls that maintain a stable smelting operation, while maximizing the molten iron production rate. In addition, it is preferable to simultaneously minimize the fuel and oxygen consumption rates. However, in direct ironmaking processes there are numerous operating parameters that affect both the rate of iron production and the rate of fuel consumption. Moreover, these same parameters generally affect the quality of the molten iron produced. Within the smelter reactor, the material feed rates, the oxygen flow rate, the bottom stirring gas flow rate, the oxygen lance and tuyere configuration, the oxygen lance height, the system pressure, and the slag weight are all examples of variables that generally affect the operating performance of the smelter reactor.

Prior art process control methods can fail to effectively maintain control of the molten iron temperature and/or the chemical composition of the hot metal produced. Moreover, prior methods of control can cause the slag to foam out of the smelter reactor. It is an object of the present invention to design a method for the stable operation of a smelter reactor that overcomes one or more of those deficiencies of the prior art.

SUMMARY OF THE INVENTION

The present invention relates to a method of producing molten iron in a stable manner in a direct smelting process in which a source of iron oxide, flux, and a source of carbon and hydrogen are charged to a smelter reactor. Oxygen and nitrogen are also charged to the smelter reactor, with at least some of the oxygen being continuously introduced via an overhead lance. Conditions are maintained within the smelter reactor to cause at least some of the iron oxide to be chemically reduced. A bath of molten iron is thus created in the bottom of the smelter reactor, surmounted by a layer of foaming slag. Carbon monoxide is generated within the smelter by the reaction of carbon with iron oxide. The carbon monoxide rises through the slag, as does the hydrogen. At least some of the carbon monoxide and hydrogen react within the smelter with the continuously charged oxygen, thereby generating heat for endothermic reactions taking place within the reactor. An offgas is released that contains $CO$, $CO_2$, $H_2$, and $H_2O$. At least some of the molten iron produced is removed from the reactor. This is the process, well known in the art, that is improved by the present invention.

In the method of the present invention, a certain group of conditions is repeatedly measured during the process. (By "repeatedly" we here mean that the condition is either continuously measured or is measured at regular or irregular time intervals.) Those conditions are the slag height, the temperature of the molten iron, the content of $CO$, $CO_2$, $H_2$, and $H_2O$ in the offgas, the carbon content of the molten iron, and the FeO content (weight percent) in the slag. One or more process variables are subsequently adjusted (after the measurements) so as to help keep one or more of those conditions (slag height, etc.) within a predetermined range. Preferably, the process variable or variables that are adjusted are selected from the group consisting of the addition rate of the carbon and hydrogen source, the addition rate of the source of iron oxide, the addition rate of flux, the addition rate of oxygen, the height of the oxygen lance relative to the slag, the rate at which the bath of molten iron is stirred, and the rate at which molten iron and slag are removed from the smelter reactor.

By utilization of the method of the present invention, one can effectively maintain control of the molten iron temperature and the molten iron carbon content, as well as prevent the slag from foaming out of the smelter reactor. In addition, the present method enables one to create a stable iron smelting process that maximizes the molten iron production rate, while minimizing the fuel and oxygen consumption rates.

By "slag height" is meant the level in the reactor where the upper surface of the slag layer is. Suitable methods of measuring slag height are known in the art. For example, slag height can be measured by an acoustic technique or by using a conductivity probe. If the slag height is not measured continuously, then it preferably is measured at least as often as once every 30 minutes.

Methods of measuring the temperature of the molten iron are also known in the art. For example, a thermocouple device or an optical pyrometer can be used. If the temperature of the molten iron is not continuously monitored, then it, too, is preferably measured at least as often as once every 30 minutes.

Means of measuring the content of $CO$, $CO_2$, $H_2$, and $H_2O$ in the offgas are also known in the art. For example, a mass spectrometer or gas chromatography equipment can be used. If the offgas's content of each of these four chemicals is not continuously measured, then it is preferred that they be measured at least once every 15 minutes.

Means of measuring the carbon content of the molten iron are likewise known in the art. For example, a sample of hot metal can be taken using a sub-lance, and that sample can then be analyzed using infra-red absorption techniques. If the carbon content of the molten iron is not continuously measured, then preferably it is measured at least as frequently as once every 30 minutes.

Methods of measuring the FeO content of the slag during the smelting reduction of iron oxide are likewise known in the art. For example, a sample of the slag can be taken using a sub-lance, and that sample can be analyzed using an x-ray spectrophotometer. If the FeO content of the slag is not continuously measured, then preferably it will be measured at least as frequently as once every 30 minutes.

For each of the above-mentioned process conditions there is a range within which it is preferred that the condition be held during the process. For example, it is preferable for the slag height to be kept more than one meter below the cone of the smelter reactor. (By the "cone" is meant the top-most portion of the reactor, where the walls slant inwardly. In the reactor shown in FIG. 2 of the drawings accompanying this specification, the cone is the "Gun/Cooled" section.)

Similarly, the temperature of the molten iron is preferably maintained within the range of approximately 1450° C. to approximately 1550° C. during operation. The carbon content of the molten iron preferably falls within the range of approximately 4% to approximately 4.5% (weight basis). In addition, it is preferable to have a FeO content in the slag within the range of approximately 2% to approximately 5% (weight basis).

The amount of CO, $CO_2$, $H_2$, and $H_2O$ in the offgas determines the post-combustion degree in the offgas. By post-combustion degree (PCD) is meant the following ratio:

$$PCD = 100 \times \frac{(\%CO_2 + \%H_2O)}{(\%CO + \%CO_2 + \%H_2 + \%H_2O)}$$

Preferably, the PCD is maintained within the range of approximately 30% to approximately 60%. If the majority (dry weight basis) of the carbonaceous fuel is coal, the PCD will preferably be kept within the range of about 30% to about 50% (e.g., about 30% to about 40%). If the majority of the fuel is coke, the PCD preferably will be kept with the range of about 45% to about 60% (e.g., about 50% to about 60%).

After the aforementioned process conditions are all measured, if any condition is outside the predetermined desired range, one or more process variables are then adjusted so as to help bring that condition inside the range. Even if none of the conditions is outside the predetermined range, if a condition is not optimum, one or more process variables may be adjusted to attempt to make it so. Thus, the measured process conditions are used as a feedback control to regulate one or more of the variables of the process. The way or ways in which a change in each of the aforementioned process variables will tend to affect one or more of the measured process conditions will now be discussed. By adjusting the addition rate of the carbon and hydrogen source, the slag height, hot metal carbon content, slag FeO content, and offgas post-combustion degree can be altered. By adjusting the addition rate of the source of iron oxide, the hot metal temperature, slag FeO level, and slag height can be altered.

By adjusting the addition rate of flux in the process, slag height can be altered. By adjusting the addition rate of oxygen to the smelter reactor, the hot metal temperature, slag height, and slag FeO content can be altered.

By adjusting the height of the oxygen lance with respect to the slag, the PCD and hot metal temperature can be altered.

In the smelting reduction of iron oxide, the bath of molten iron can be stirred by the injection of nitrogen using tuyeres installed at the bottom of the smelter reactor. By adjusting the rate at which the bath of molten iron is stirred, the PCD, hot metal carbon content, and hot metal temperature can be altered.

By adjusting the rate at which molten iron and slag are removed from the smelter reactor, the PCD, slag height, and slag FeO content can be altered.

DETAILED DESCRIPTION OF THE PREFERRED EMBODIMENTS

Figure 1:
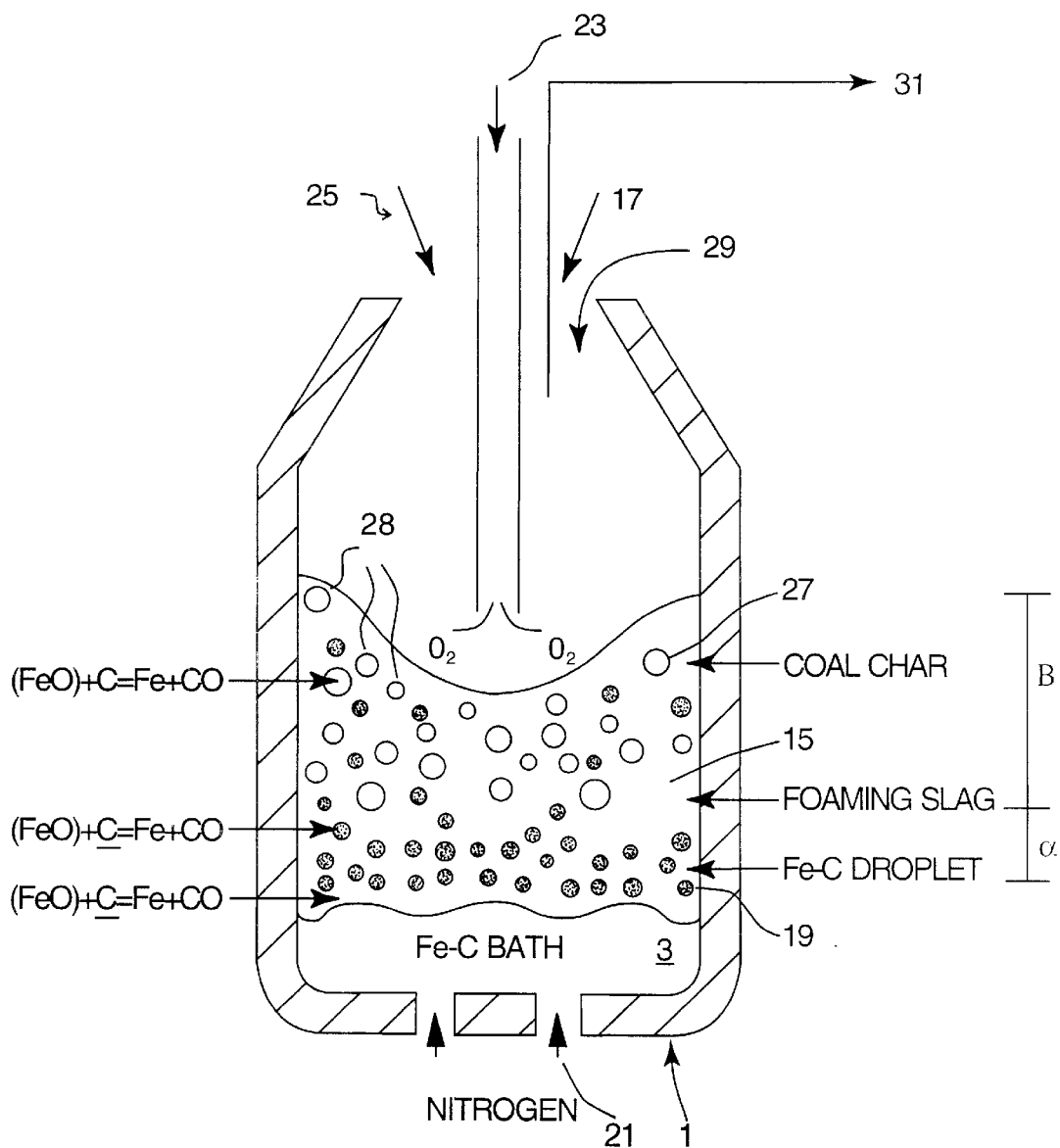
FIG. 1 is a schematic drawing of a smelter reactor.
Figure 2:
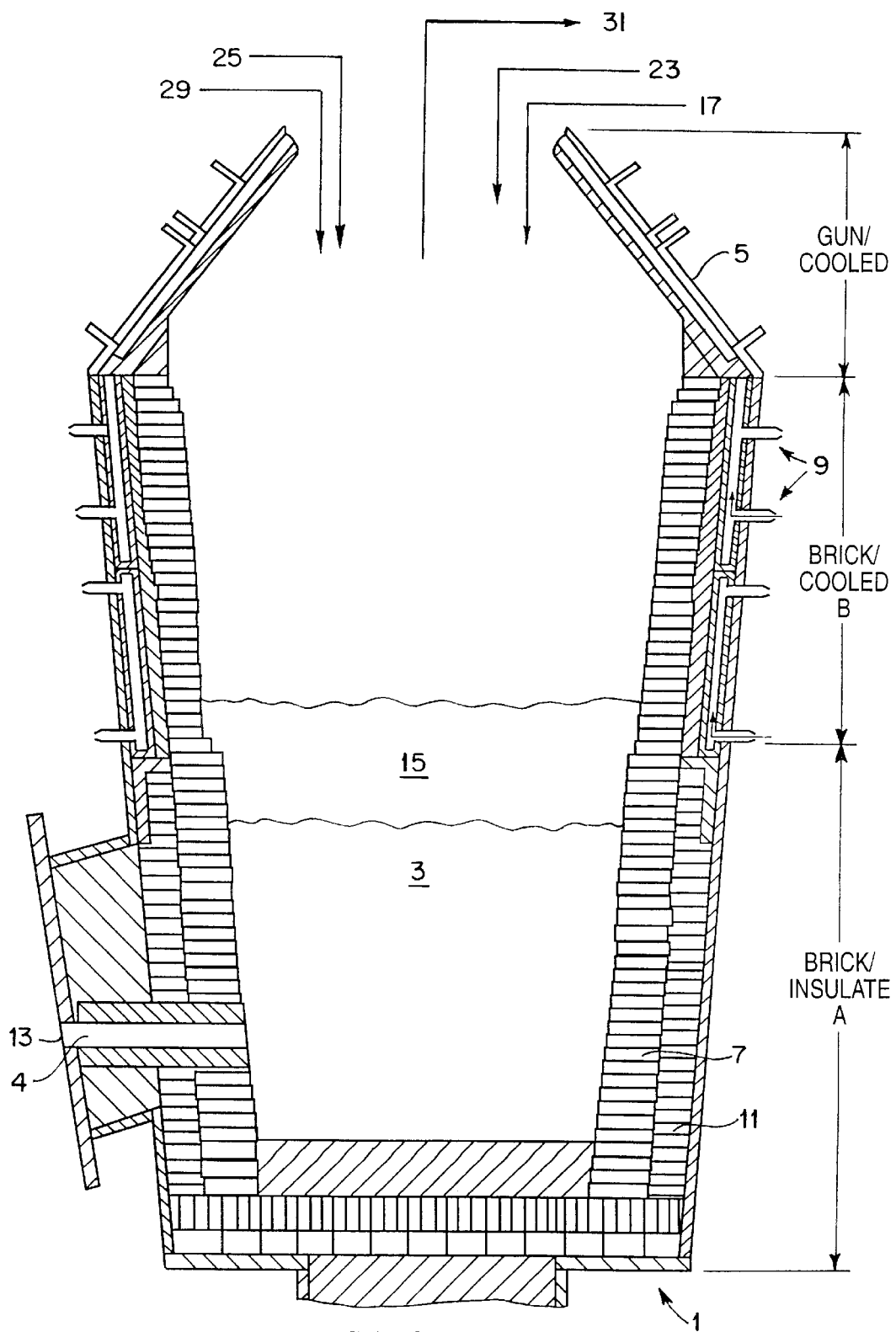
FIG. 2 is a schematic drawing of one example of a smelter reactor showing various structural features.

FIG. 1 illustrates a smelter reactor 1, used for the production of molten iron 3. The smelter reactor 1 can be any of a number of types of smelter reactors commonly known to those skilled in the art and used for the smelting of metals and their ores. FIG. 2 shows one example of a smelter reactor 1 used in the generation of molten iron bath 3. The smelter reactor 1 has a brick/cooled section A and a brick/insulated section B in which the process of the invention is to occur. The smelter reactor 1 has a water-cooled cone and hood 5 at the top of the smelter reactor 1. The smelter reactor 1 is lined with a refractory brick 7 up to the cone 5 of the smelter reactor 1. The refractory brick 7 located above the molten iron bath 3 is backed by water-cooled staves 9. The refractory brick 7 located below the molten iron bath 3 is backed by an insulating safety lining 11. Both the cone and hood 5 are water cooled by staves 9 as well. Smelter reactor 1 contains a taphole 13, where molten iron 3 or slag 15 is removed.

As seen in FIG. 1, a source of iron oxide 17, such as iron ore, is being reduced to iron and the resulting iron is being refined. A molten iron bath 3 is formed in the bottom of smelter reactor 1. A molten, foamy layer of slag 15 surmounts the iron bath 3. The slag 15 consists of a dense slag region $\alpha$, and foamed slag region $\beta$. The dense slag region $\alpha$ has molten iron droplets 19 dispersed throughout. The iron droplets 19 are formed by emulsification of the iron bath 3 by the addition of nitrogen gas 21 and oxygen 23 to the smelter reactor 1 and by the reduction of iron oxide. Preferably, the nitrogen gas 21 is introduced to the bottom of the smelter reactor 1 through tuyeres (not shown). The introduction of nitrogen 21 aids the stirring and mixing of molten iron 3 in smelter reactor 1. Preferably oxygen 23 is continuously top blown via a central, water-cooled, dual circuit lance (not shown) into the slag 15. U.S. Pat. No. 5,374,297, incorporated herein by reference, discloses a suitable structure of an overhead lance for injecting oxygen 23. In addition, foaming slag region $\beta$ has some quantity of molten iron droplets 19 dispersed throughout, but not to the extent of the $\alpha$ region.

A carbon and hydrogen source 25 is charged to the smelter reactor 1 to produce char particles 27 that are dispersed throughout the foaming region $\alpha$ of slag 15. The aggregate of all the char particles 27 in slag 15 make up total char 28. Preferably, the carbon and hydrogen source 25 consists of one or more of the following: coke breeze, low volatile coal, medium volatile coal, and high volatile coal. Some of the carbon typically will be in elemental form, which is referred to herein as "fixed carbon." The rest of the carbon will be present in the carbon source as hydrocarbon compounds that volatize at the temperatures inside the reactor. That portion may be referred to herein as "volatile matter carbon." The carbon and hydrogen source material 25 is advantageously top charged via the same overhead lance used to introduce oxygen 23. In addition, a flux 29 is charged to the smelter reactor 1, e.g., also by way of an overhead lance (not shown).

The iron oxides 17 charged to the smelter reactor 1 dissolve in the layer of slag 15 and are reduced by char 28 and carbon contained within iron droplets 19 present in the slag 15. Gangue components of the carbon source 25 and the iron oxide source 17 report to the layer of slag 15. Examples of such gangue components are oxides of calcium, silicon, magnesium, aluminum, etc. In addition, certain feeds may contain high levels of sulfur, as described in the U.S. patent application Ser. No. 08/828,268 entitled "Method for Reducing Sulfur Levels in the Offgas of an Iron Smelting Process Utilizing Post Combustion" by Sarma et al. filed Mar. 2, 1997, incorporated herein by reference.

At some point during operation, the bath of molten iron 3 and the layer of slag 15 that are produced are tapped, to remove some of each respective layer from the smelter 1. Preferably, the smelter reactor 1 is tapped at a single taphole 13 using a mudgun and drill system (not shown). The removed molten iron 3 is carbon saturated hot metal 4 that can be further pigged/granulated, or used in a basic oxygen furnace or electric arc furnace for the production of steel. The combined effect of the devolatilization of the carbon and hydrogen source 25, the combustion of fixed carbon and volatile matter, and the reduction of iron oxide 17 is the evolution of gases which cause at least part of the layer of slag 15 to foam. At least a portion of this gas is CO, which is produced by the primary combustion of fixed carbon and volatile matter carbon. The CO present within the foamy layer $\beta$ of slag 15 subsequently rises to the surface of slag 15. At least some of the CO reacts with the continuously charged oxygen 23 and hydrogen present within smelter reactor 1.

The rising gases also cause at least some of the slag 15 to be thrown up into the free space of the smelter reactor 1, which is referred to as slag splatter. The slag 15 also contains char 28 that remains after the carbon source 25 has devolatized. The slag 15 is crucial to the smelting process since it is the medium where reduction and heat transfer occur. Moreover, slag 15 separates the hot iron bath 3 from the continuously blown oxygen 23, preventing reoxidation of the iron.

The thermal requirements of the process are provided by the heat generated during a primary combustion reaction and a post-combustion reaction. In the primary reaction, fixed carbon and volatile matter react with the continuously blown oxygen 23 to produce CO. In the post-combustion reaction, the CO and $H_2$ react with the top-blown oxygen 23 to produce $CO_2$ and $H_2O$. The heat generated from those reactions is transferred to the incoming raw material stream, to the slag 15 via radiation and convection, to the iron droplets 19 and to the char 28 present in the slag 15. Heat is also transferred to the refractory bricks 7 and the water-cooled staves 9. The remainder of the heat generated is contained within the offgas 31 exiting the smelter reactor 1. The offgas 31 contains a plurality of constituents, including CO, $CO_2$, $H_2$, and $H_2O$.

Numerous phenomena normally occur within the smelter reactor 1, including the dissolution of iron oxides 17 in the slag 15, devolatilization of coal, dissolution of carbon into molten iron, dust generation, reduction of iron oxides 17 from the slag 15, slag foaming, post-combustion and heat generation, and the transfer of heat from the combustion reactions to the process. The interrelationships between various process parameters are governed by these process phenomena. Applicants have conducted numerous experiments in order to understand the process phenomena necessary for an effective process control scheme.

In one embodiment of the invention, various conditions are repeatedly measured to ensure an effective process control scheme. Preferably, the content of CO, $CO_2$, $H_2$, and $H_2O$ in the offgas 31, the post-combustion degree, the FeO % content of slag 15, the carbon content of hot metal 4, the slag height, the temperature of hot metal 4, the heat losses to the water-cooled circuits, and the temperature of offgas 31 are all measured. Additional process parameters are advantageously measured, including the material feedrates, gas flowrates, system pressure, lance height, and the amount of slag 15 and iron 3 tapped from the smelter 1.

In tests that were conducted, the offgas 31 composition was analyzed using multiple Perkin-Elmer mass spectrometers. The contents of CO, $CO_2$, $H_2$, $H_2O$ $N_2$, and Ar were measured in the offgas 31 every four seconds. The post-combustion degree (PCD) was calculated using the offgas 31 composition and the following formula:

$$PCD = 100 \times \frac{(\%CO_2 + \%H_2O)}{(\%CO + \%CO_2 + \%H_2 + \%H_2O)}$$

where the percentage refers to the volume percent of the relevant gas species, as measured by the offgas analyzer.

The FeO content of the slag and the carbon content of hot metal 4 were obtained from the chemical analysis of samples taken using a sub-lance (not shown). The temperature of the molten iron 3 was also measured using the sub-lance. The slag foam height was measured either by a conductivity probe or by a chain attached to the sub-lance. These measurements were intermittent and obtained only when the relevant probes were attached to the sub-lance.

The heat losses to the water-cooled portions of the smelter reactor 1 were obtained by measuring the flowrate, inlet temperature, and exit temperature of water passing through staves 9. The temperature of offgas 31 in the exit duct was measured by a thermocouple. The weight of slag 15 was calculated from a mass balance by taking into account the gangue components of the input materials and the amount of tapped slag 15.

The main process variables are the material feed rates, oxygen flow rate, bottom stirring gas flow rate, oxygen lance and tuyere configuration, lance height, system pressure, and slag weight. A change in the rate of input of solid material or gas to the smelter can be made in a very short time. Preferably, in order to maintain stable operation of smelter reactor 1, one or more process variables are subsequently adjusted so as to keep one or more process conditions within a predetermined range.

Preferably, the configuration of the oxygen lance and tuyere are fixed during operation. However, the position of the oxygen lance in relation to the slag 15 can be altered during the smelting operation. For example, co-pending U.S. patent application Ser. No. 08/823,012 by Sarma et al. entitled "Method For Reducing Iron Losses in an Iron Smelting Process," filed Mar. 21, 1997, and incorporated herein by reference, discloses a method of altering the position of the lance to reduce iron losses.

The system pressure is normally fixed at the maximum possible, since this generally results in better operating performance. Thus, for a given lance and tuyere configuration, the prime process variables subject to alteration between casts are the material feedrates of carbon, hydrogen, and iron oxide sources, the flowrate of $O_2$, the flowrate of $N_2$, and the lance height.

Numerous trials were conducted by applicants at a pilot plant to investigate the relationship between the process variables and operating conditions. A main objective of the trials was to demonstrate stable operation under the operating condition employed. This implied maintaining control of the temperature and carbon content of hot metal 4. In addition, the height of slag 15 was to be controlled such that the slag 15 did not foam out of the smelter reactor 1 into the offgas duct.

As stated previously, for development of a stable control scheme it is important to understand the interrelationships between the parameters that are critical to operation of the smelter 1. To this end, applicants have developed a control scheme to maintain stable operating conditions. The basis for the control scheme arises out of the relationship between (a) the FeO % content (by weight) in slag 15, (b) the amount of char 28 in the slag 15, (c) the measured post-combustion degree of the offgas 31, (d) the height of the lance relative to the slag 15, (e) the height of slag 15, (f) the temperature of hot metal 4, (g) the carbon content of hot metal 4, and (h) the temperature of offgas 31. The relationship between the process parameters is discussed below. Theories describing process phenomena are reviewed. In addition, pilot plant data serving as a basis for a control scheme are presented.

The reduction kinetics in the smelter reactor 1 govern the relationship between the FeO % content of the slag 15, the feedrate of iron oxide 17, the weight of slag 15, the weight of char 28, the size distribution of char particles 27, the iron droplet 19 weight, and the size distribution of iron droplets 19. Within the smelter reactor 1, the overall production of iron 3 results from chemical reactions between the FeO in the slag 15 and (a) char particles 27 in the slag 15, (b) carbon containing iron droplets 19 in the slag 15, and (c) carbon contained within the iron bath 3. The total iron production rate may be expressed, in simplified form, by the following equations:

$$R_{total} = (k_1 + k_2) \times W_S \times (\% \text{ FeO}) \quad (2)$$

where $R_{total}$ is the total iron production rate (kg/h), $k_1$ is the rate coefficient for the slag-metal reactions, $k_2$ is the rate coefficient for the slag-char reactions, $W_S$, is the weight of slag 15, and (% FeO) is the FeO % content by weight of the slag 15. $R_{total}$ is related to the feedrate of the iron-bearing materials 17. With others parameters being held constant, a higher feedrate of iron-bearing materials 17 to the smelter 1 will result in higher slag FeO % content. The rate coefficient for the slag-metal reactions, $k_1$, includes the interfacial area between the iron droplets 19 and slag 15, as well as the interfacial area between the iron bath 3 and the slag 15. The interfacial area between the iron droplets 19 and slag 15 is dependent on the size distribution of the droplets 19 in the slag 15. The interfacial area may be represented by (i) an average droplet diameter and (ii) the weight ratio of metal droplets 19 to slag 15. With other parameters being constant, a larger average droplet diameter results in a higher slag FeO % content. Conversely, an increased droplet-to-slag weight ratio results in lower slag FeO % levels.

The mathematical representation of the rate coefficient for the slag-char reaction, $k_2$, is similar to that for the slag-metal reactions. The interfacial area for the slag-char reactions may be represented by an average char particle 27 diameter, and the weight ratio of char 28 to slag 15. With other parameters being constant, a larger char particle 27 diameter results in higher slag FeO % content. Conversely, a higher char-to-slag weight ratio results in lower slag FeO % levels. From equation (2), it can also be deduced that a higher weight of slag 15 results in lower slag FeO % levels, with other parameters remaining constant.

The reaction between smelting slag 15 and iron-carbon droplets 19 was studied. The reaction rate was found to be affected by the sulfur content in the droplet 19. The surface active nature of sulfur, it was concluded, results in the reaction being controlled by chemical kinetics at high sulfur levels. From the experimental work, the rate constant for the slag-metal reactions is estimated to be approximately $4 \times 10^{-4}$ tonnes/(h m$^2$% FeO).

The reaction between smelting slag 15 and solid carbon was studied. Experiments were conducted with graphite, coke, and coal char. The reaction rate was experimentally determined to be independent of the form of carbon used. Moreover, the reaction rate was found to be mass-transfer controlled. The reaction rate was discovered to be proportional to (% FeO)$^n$, where n is slightly greater than 1. Experimentally, the rate constant for the slag-char reaction, $k_2$, was estimated and the non-linear dependence on (% FeO) was taken into account.

Consequently, the rate coefficients $k_1$ and $k_2$ could be estimated. The average diameter of the metal droplets 19 in the slag 15 was estimated to be approximately 1 mm, while the droplet-to-slag weight ratio was estimated to be 0.1. The char-to-slag weight ratio calculated from the material balances ranged from 0.15 to 0.35 during normal smelter operation. The range of values for the char-to-slag weight ratio were used in equation (2). The range of values for the average char particle 27 diameter was taken to be 3 to 6 mm when using equation (2).

Figure 3:
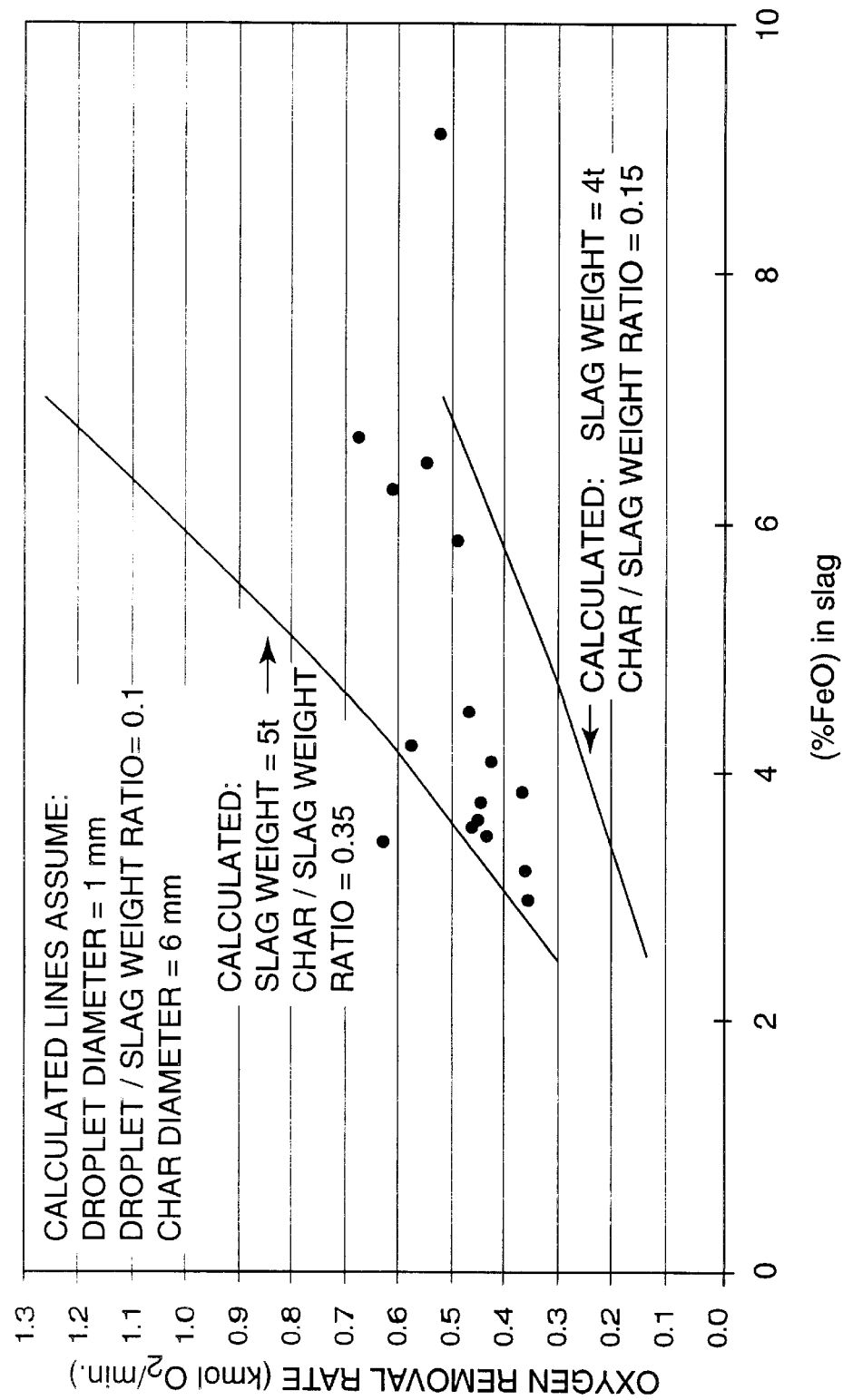
FIG. 3 is a graph illustrating the oxygen removal rate versus slag FeO % content.

FIG. 3 shows the relationship between the oxygen removal rate, expressed in kmol O$_2$/min, and the FeO % content of slag 15 for data obtained during pilot plant operations. These data are for situations when the weight of slag 15 was in a narrow range of around 4 to 5 tonnes. The filled circles represent the data obtained at the pilot plant, while the solid lines represent the calculated relationship. The oxygen removal rate from the iron ore is equivalent to the production rate of iron 3 and is determined from the feedrate of the iron-bearing oxides 17. The scatter in the data is caused by variations in the weight of slag 15, average char particle 27 size, char-to-slag weight ratio, size of iron droplets 19 and the droplet-to-slag weight ratio. The solid lines were calculated using the rate equation discussed above and the following parameters. The average char particle 27 diameter was taken to be 6 mm and the average diameter of iron droplet 19 was taken to be 1 mm. The droplet-to-slag weight ratio was taken to be 0.1. The lower solid line was calculated for a char-to-slag weight ratio of 0.15 and a slag weight of 4 tonnes. The upper solid line was calculated for a char-to-slag weight ratio of 0.35 and a slag weight of 5 tonnes.

As can be seen from FIG. 3, the oxygen removal rate increases at higher slag FeO % levels. From equation (2), it can be seen that the slope of the oxygen removal rate versus the FeO % content of the slag 15 at constant slag weight, should be positive. This is indicated by the data, wherein the slope is dependent on the char-to-slag weight ratio, the size of char particles 27, the droplet-to-slag weight ratio, and the size of iron droplets 19. It is worthwhile to review the two extreme situations which are represented by data points lying outside the solid lines. For the datum point at about 9% FeO, observation into the smelter reactor 1 at turndown indicated that not much char 28 was present. For the datum point at about 3% FeO, the higher oxygen removal rate was a result of substantial char 28 present at turndown.

Figure 4:
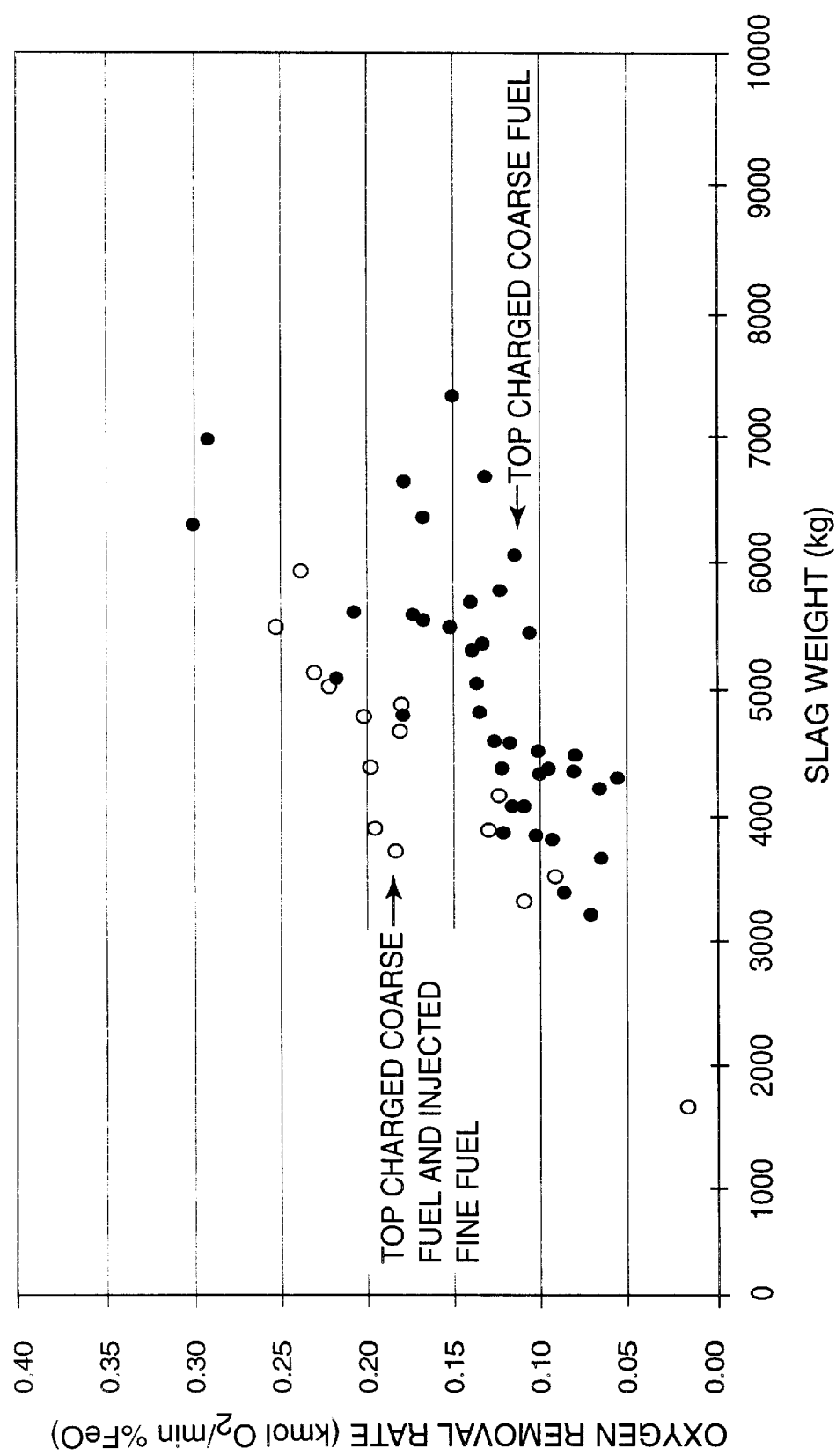
FIG. 4 is a graph illustrating the oxygen removal rate per unit slag FeO % versus the weight of the slag.

The oxygen removal rate per unit slag FeO % is plotted against weight of slag 15 in FIG. 4. Pilot plant data obtained during operation with top-charged coarse coal as well as top-charged coarse coal and injected fine coal are shown. (Note that top-charged coal or coarse coal also includes coke breeze.) The increase in the removal rate of oxygen 23 per unit slag FeO % at higher slag weight is evident. This trend is also predicted by equation (2) and the slope of the plot is dependent on the parameters affecting $k_1$ and $k_2$, namely the size of droplets 19 the droplet-to-slag weight ratio, the char particle 27 size, and the char-to-slag weight ratio. The effect of the size of char particles 27 on the removal rate of oxygen 23 per unit slag FeO %, at a given slag weight, is evident in the difference between the data for operation with only coarse coal versus that for operation with coarse and fine coal. This is explained by the smaller diameter of the char particles 27 when operating with a mix of coarse and fine coal, which yields a higher value for $k_2$ and, consequently, a higher oxygen removal rate per unit slag FeO %.

Figure 5:
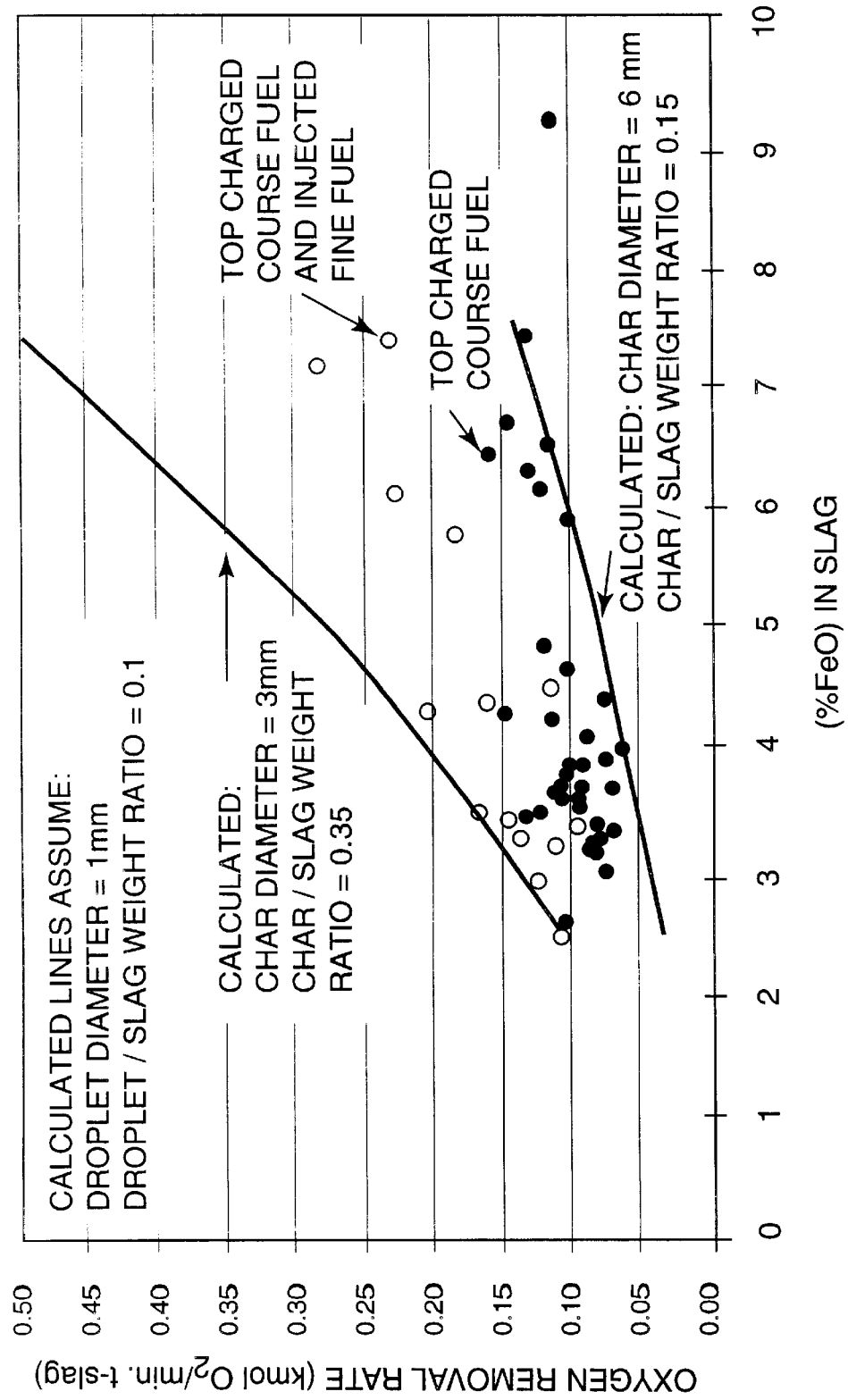
FIG. 5 is a graph showing the oxygen removal rate per unit slag weight versus slag FeO % content.

The relationship between the oxygen removal rate per unit weight of slag 15 and the slag FeO % content is illustrated in FIG. 5. A comparison between the data for operation with coarse coal and that for a mix of coarse and fine coal is also depicted. The data presented in this figure encompass a weight of slag 15 in the range of about 1.5 to 8 tonnes. The solid lines were calculated for an average diameter of droplet 19 of around 1 mm and a droplet-to-slag weight ratio of 0.1. The lower solid line assumes an average diameter of char particle 27 of around 6 mm and a char-to-slag weight ratio of 0.15. The upper solid line is for a char diameter of 3 mm and a char-to-slag weight ratio of 0.35. As can be seen from FIG. 5, the increase in the oxygen removal rate per unit slag weight with increasing slag FeO % is consistent with equation (2). In addition, a smaller average char particle diameter results in a higher oxygen removal rate per unit slag weight, at a given slag FeO %.

The applicability of this information is relevant to smelter 1 operation and scale-up. As stated earlier, the amount of char 28 present in the slag 15 is believed to be an important parameter in the smelting process. The weight of char 28 affects the slag FeO % content, post-combustion degree, and slag foaming. Unfortunately, the weight of char 28 is not a directly measurable quantity and must be calculated from the carbon balance. However, during smelter operation, errors in the carbon balance can be caused by problems with the analysis of the offgas 31. In addition, incorrect estimation of carbon dust leaving the smelter 1 and incorrect coal feedrate measurements can skew the carbon balance. It is believed that even small errors in these parameters can cause significant errors in the estimation of the weight of char 28 over a twelve-hour operating period. Thus, it is thought to be unwise to rely on the calculated weight of char 28 for process control purposes. However, the amount of char 28 present in the slag 15 can be inferred if the FeO % content of the slag 15 and the weight of slag 15 are known. This can be done by using established relationships between the oxygen removal rate per unit of slag weight and the slag FeO % content as shown in FIG. 5. For example, during actual operation with only coarse coal, if the oxygen removal rate per unit weight of slag 15 is closer to the lower solid line in FIG. 5, then it can be deduced that there is less char than usual in the smelter 1. An appropriate change in the coal and iron oxide 17 feed rates can then be made to return operation to the desired state. On the other hand, if the oxygen removal rate per unit weight of slag 15 is closer to the upper solid line, then it can be inferred that there is excess char 28 and the required changes may be made.

The information presented in FIGS. 3 through 5 also show that operating with a mix of coarse and fine coal will result in lower slag FeO % levels with other parameters being constant. A lower slag FeO %. level advantageously results in improved iron yields and reduced chemical attack on the refractory bricks 7. However, there is a limit to the smallest size of char particles 27 that can be used. As will be discussed later, if the char particles 27 are too small, the slag 15 will foam excessively and adversely impact smelter 1 operation.

The information presented in FIG. 5 can also be used when designing a scaled-up smelter reactor 1. A critical question when scaling up a smelter reactor 1, for a specified production rate, is the required volume. The weight of slag 15 is one of the parameters that determine the required smelter reactor volume. When the production rate, the slag FeO % content, the size of char particles 27, and the char-to-slag weight ratio are specified, the required weight of slag 15 can be calculated as follows. For example, at an FeO % content of 5%, with an average diameter of 6 mm for char particles 27, and a char-to-slag weight ratio of 0.2, FIG. 5 shows an oxygen removal rate per unit of slag weight of approximately 0.15 kmol $O_2$/(min×t-slag). At a production rate of 35 tonnes per hour, corresponding to an oxygen removal rate of 6 kmol $O_2$/min for the given iron oxide composition, the required weight of slag 15 is then calculated to be around 40 tonnes.

A central feature of this process is the partial afterburning of the offgas 31 and the subsequent heat recovery within the smelter 1. The afterburning of the offgas 31 is referred to as post-combustion or secondary combustion, with the post-combustion degree being represented by equation 1. The post-combustion degree (PCD) of the offgas 31 is affected by the amount of char 28 in the slag 15, the lance gap, the lance configuration, the bottom stirring gas flowrate, the system pressure, and the volatile matter input. The lance gap is defined as the distance between the tip of the lance (the lowermost oxygen outlet) and the upper surface of slag layer 15. The PCD varies directly with the lance gap and system pressure, while it is inversely related to the char weight, bottom stirring gas flowrate, and the volatile matter input.

Figure 6:
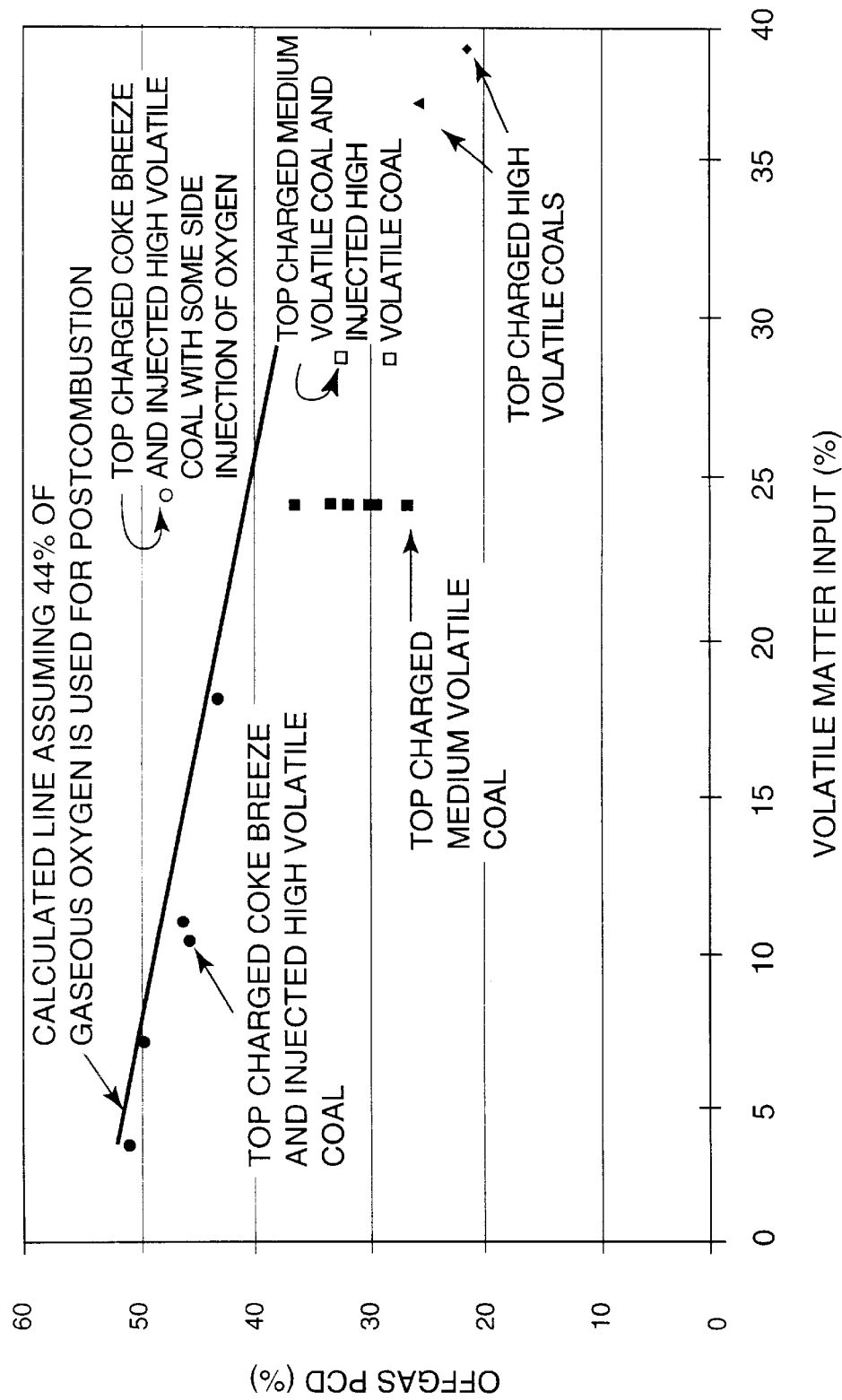
FIG. 6 is a graph illustrating the effect of the amount of volatile matter input to the smelter reactor on the offgas post-combustion degree.
Figure 7:
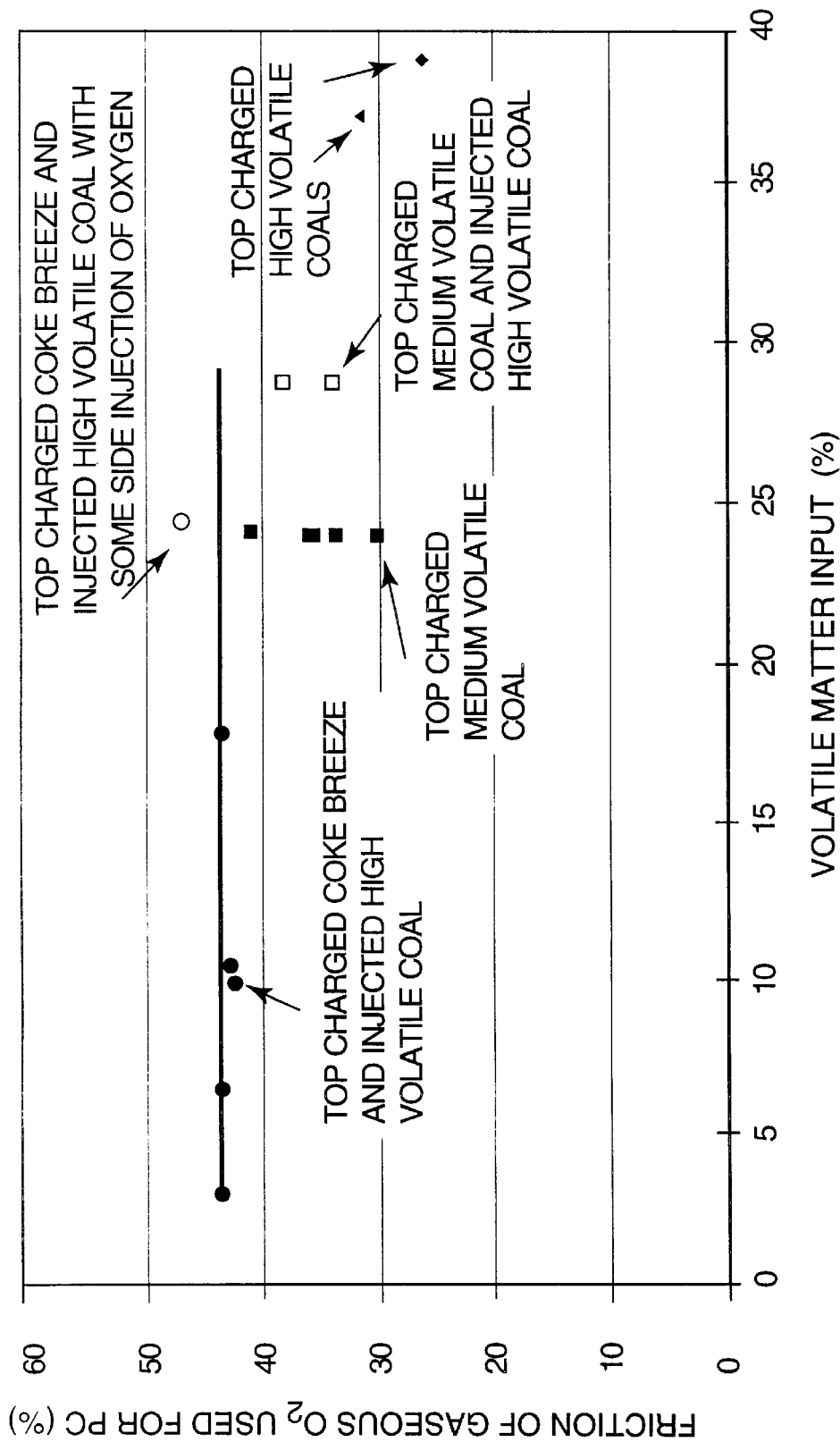
FIG. 7 is a graph showing the relationship between the fraction of gaseous oxygen used for post-combustion and the amount of volatile matter input to the smelter reactor.

FIG. 6 shows the effect of volatile matter input on the PCD. As can be seen from FIG. 6, increasing the volatile matter input to the smelter 1 results in a lower offgas PCD. The solid line represents the calculated offgas PCD if 44% of the gaseous oxygen 23 input to the smelter 1 is used for post-combustion. For operation with coke breeze and coal injection, this appears to be the case. However, with medium and higher volatile coals, the fraction of gaseous oxygen 23 used for post-combustion is lower, as can be seen in FIG. 7. For operation with top-charged coke breeze and injected high volatile coal, the fraction of gaseous oxygen 23 used for post-combustion is almost 50% when a portion of the oxygen 23 is injected through side tuyeres. The scatter in the data for operation with top-charged medium volatile coal is caused by variations in the lance gap and weight of char 28.

Figure 8:
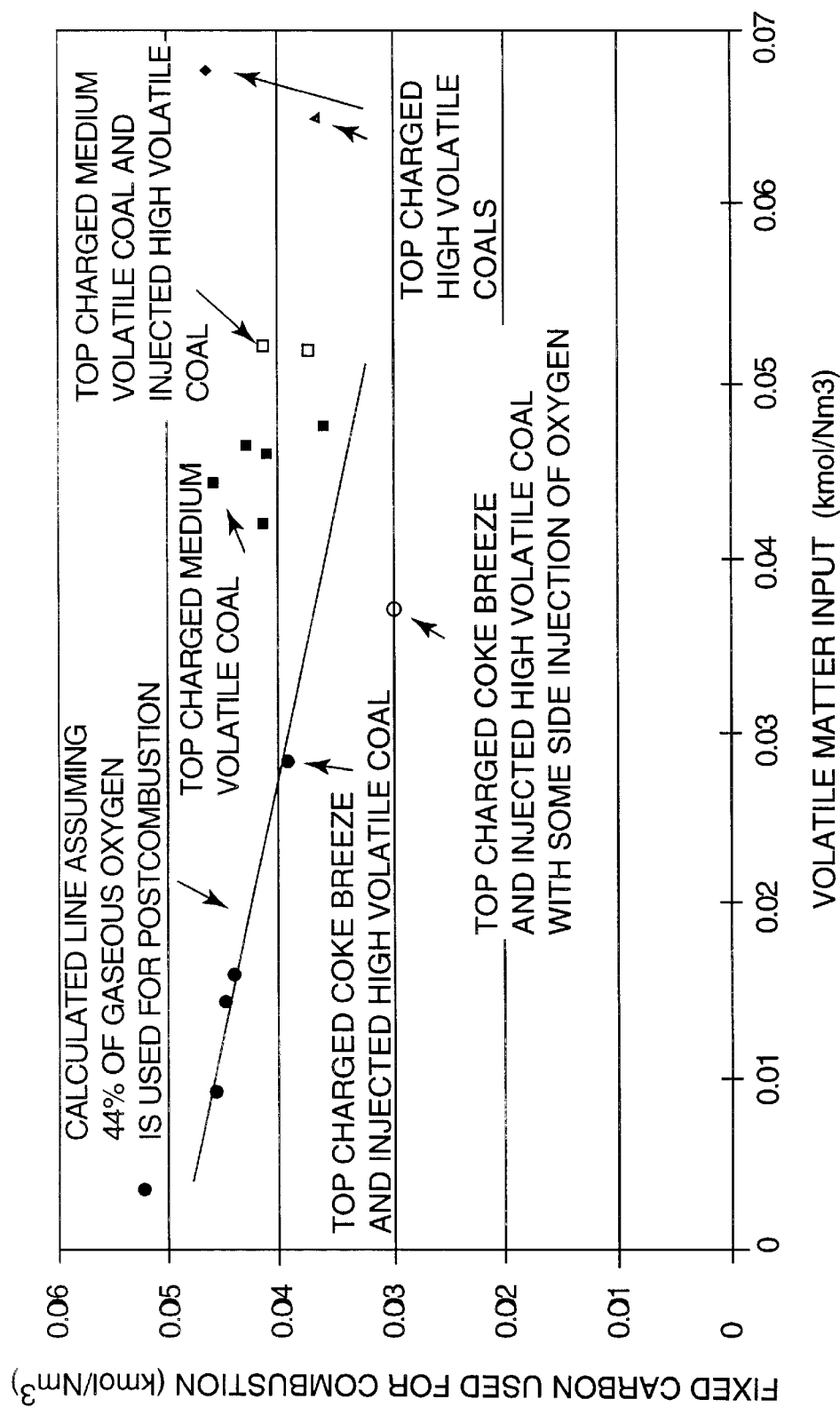
FIG. 8 is a graph showing the relationship between the quantity of fixed carbon used for combustion and the quantity of volatile matter input to the smelter reactor.

During the pilot plant trials, the oxygen blowing rate was usually around 5500 $Nm^3$/h. The amount of oxygen 23 available for post-combustion is determined by the amount of oxygen used for combustion of fixed carbon. The fixed carbon content of coal decreases with increasing volatile matter content. In order to maintain similar fuel rates with low and high volatile coals, the carbon and hydrogen content of the volatile matter must be effectively burnt, such that the fixed carbon consumption decreases. FIG. 8 illustrates the relationship between the fixed carbon used for combustion and the volatile matter input. By comparing experimental data for operation with top-charged coke breeze to that for operation with top-charged coke breeze and injected high volatile coal (40% of the total fuel input), it can be seen that the degree of volatile matter utilization is around 51%. A similar calculation to compare operation between top-charged coke breeze and top-charged high volatile coal shows that the degree of volatile matter utilization is only around 24%. Thus, the utilization of volatile matter at the pilot plant was higher when high volatile coal was injected, as opposed to when high volatile coal was top-charged.

In summary, it can be said that increasing the volatile matter input to the smelter reactor 1 results in a decrease in the offgas PCD. For operation with top-charged coke breeze and injected high volatile coal of up to 40% of the total fuel input, PCD levels greater than 43% can be achieved. The utilization of volatile matter from the injected coal was about 51% and the fraction of gaseous oxygen 23 used for post-combustion was about 44%. When part of the oxygen 23 was injected through side tuyeres, the fraction of gaseous oxygen used for post-combustion was nearly 50%. This resulted in a higher offgas PCD. For operation with top-charged medium and high volatile coals, the offgas PCD was in the 23 to 37% range. For top-charged medium volatile coal and injected high volatile coal (40% of the total fuel input), operation at a PCD level of about 34% was demonstrated. Consequently, for a given operating practice, the offgas PCD range, the fraction of gaseous oxygen 23 used for post-combustion, and the amount of fixed carbon used for combustion can be quantified and used as a basis for defining an operating window.

As stated earlier, the lance gap also affects the offgas PCD. Preferably, the lance height is continuously recorded while the slag height is measured intermittently, using a probe attached to the sub-lance (not shown). A positive lance gap means that the surface of the slag 15 is below the lance tip.

Figure 9:
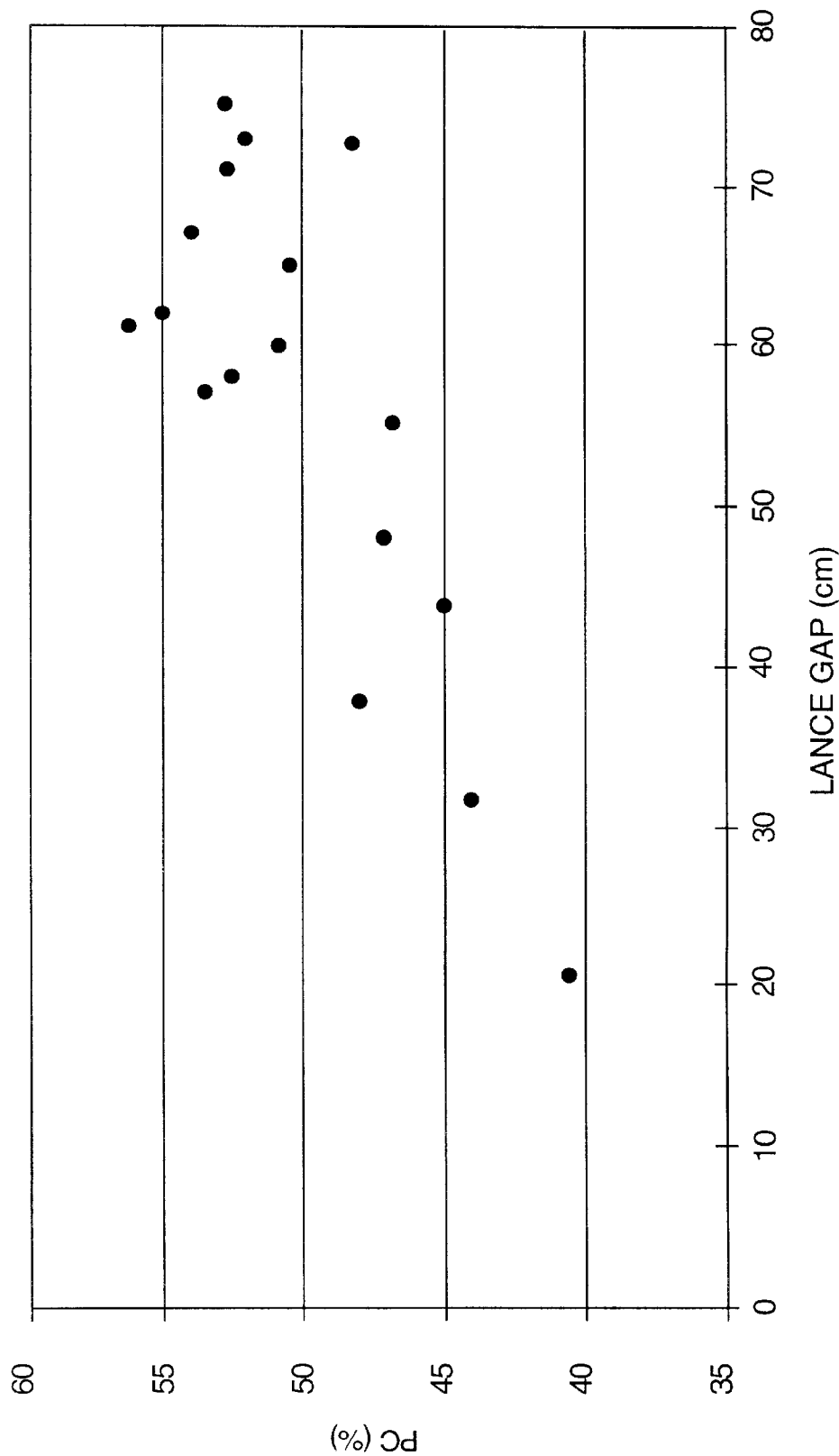
FIG. 9 is a graph illustrating the relationship between the lance gap and the post-combustion degree for operation with coke breeze as the source of carbon.
Figure 10:
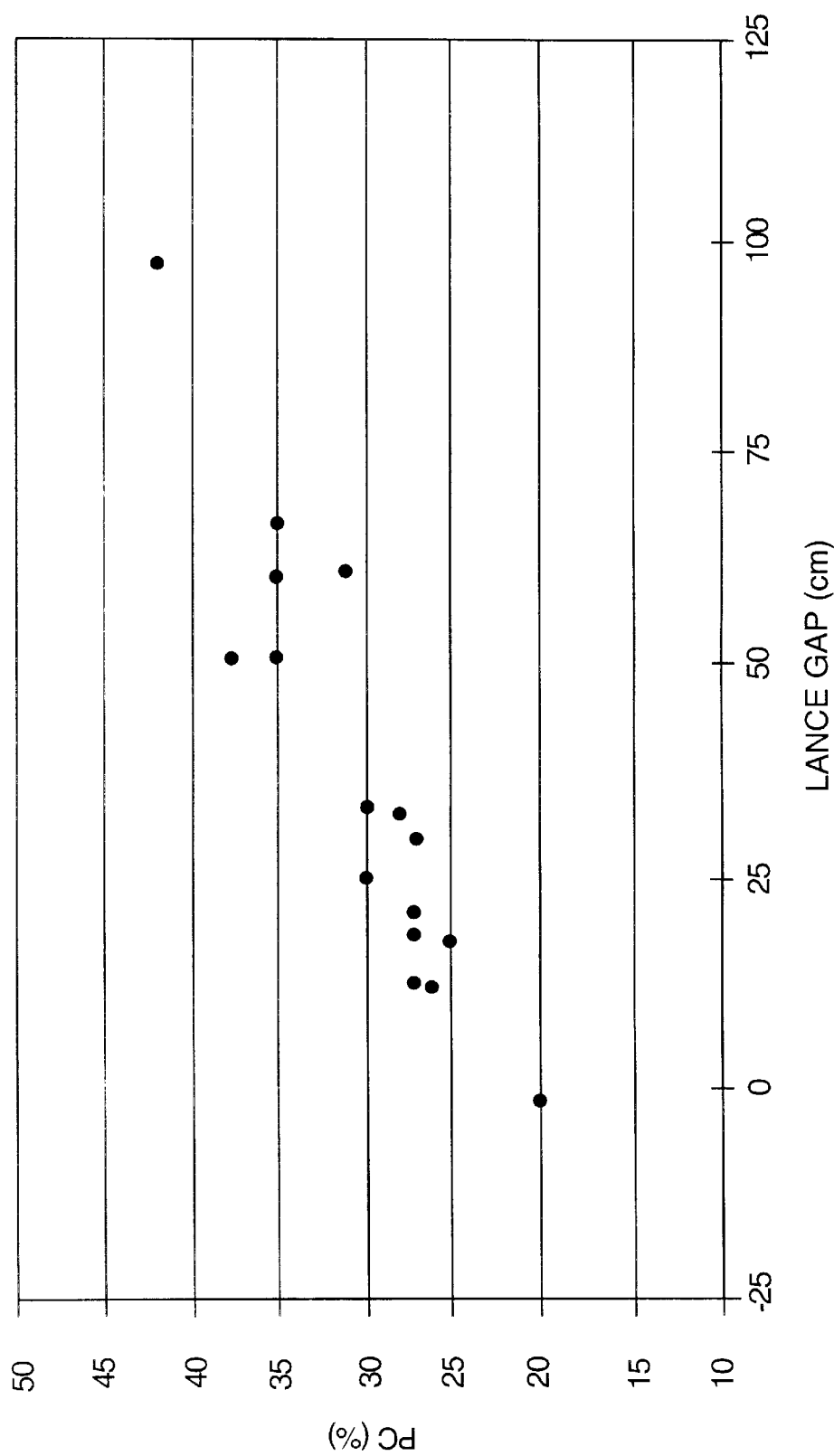
FIG. 10 is a graph illustrating the relationship between the lance gap and the post-combustion degree for operation with medium volatile coal as the source of carbon.

The pilot plant trials show that the offgas PCD was directly related to the lance gap. This is illustrated in FIGS. 9 and 10. FIG. 9 shows the data for operation with top-charged coke breeze, while FIG. 10 shows the data for operation with top-charged medium volatile coal. From FIG. 9 it can be seen that to obtain offgas PCD levels in excess of 50%, the lance gap must be greater than about 55 cm. With medium volatile coal, in order to obtain PCD levels in excess of 35%, the lance gap must be greater than about 50 cm. This information is important for operating purposes, since it can be used to infer the weight of char 28 in the smelter 1. For example, for operation with coke breeze, if the measured PCD is less than 50%, despite the lance gap being in excess of 55 cm, and other parameters such as pressure are in the usual range, the lower PCD may be attributed to excess char 28 present in the smelter 1. Lowering the carbon-to-iron ore ratio input to smelter 1 can then decrease the required amount of char 28 and return the PCD to the preferred range. The effect of the weight of char 28 on the PCD is discussed in the following paragraphs.

The relationship between the weight of char 28 and the offgas PCD is based on the reaction between $CO_2$ and $H_2O$ with char particles 27. The extent to which these reactions occur between the offgas 31 and char 28 plays an important role in determining the final PCD of the offgas 31. The reactions, which result in the production of Co and $H_2$, are shown below:

$$CO_{2(g)} + C_{(s)} \rightarrow 2CO_{(g)} \quad (3)$$

$$H_2O_{(g)} + C_{(s)} \rightarrow H_{2(g)} + CO_{(g)} \quad (4)$$

The relationship between the change in the offgas PCD as a function of the excess weight of char 28 can be derived using the individual rate equations for reactions (3) and (4). The mathematical relationship between the difference in the offgas PCD and the excess interfacial area for the gas-char reactions, shown above, are represented in equations (5) and (6), below.

$$\Delta(PCD) = \frac{\left(1 + \frac{(PCD)}{100}\right)(k_{CO2}\Delta p_{CO2} + k_{H2O}\Delta p_{H2O})A_c}{N_c + N_{H2} + A_c \times (k_{CO2}\Delta p_{CO2} + k_{H2O}\Delta p_{H2O})} \times 100 \quad (5)$$

$$\Delta(PCD) = (PCD)_{initial} - (PCD)_{final} \quad (6)$$

where PCD is the offgas post-combustion degree in the initial state, $k_{CO2}$ is the rate constant for reaction (3), $k_{H2O}$ is the rate constant for reaction (4), $A_c$ is the excess interfacial area for the gas-char reactions, $N_c$ is the total amount of carbon in the offgas 31 in the initial state, $N_{H2}$ is the total amount of $H_2$ in the offgas 31 in the initial state, and $\Delta P_{CO2}$ and $\Delta P_{H2O}$ are the driving forces for reactions (3) and (4) respectively. The excess char weight of char 28 is related to the excess interfacial area for the gas-char reactions through the average diameter of char particles 27. In order to use the above equations to predict the relationship between the change in the offgas PCD and excess char weight, a clear understanding of the mechanism and rate of reactions (3) and (4) under smelting conditions was needed. Since this information was not available, calculated relationships could not be developed. However, data from the pilot plant trials were used to determine the relationship between the change in the offgas PCD and the change in the weight of char 28.

Figure 11:
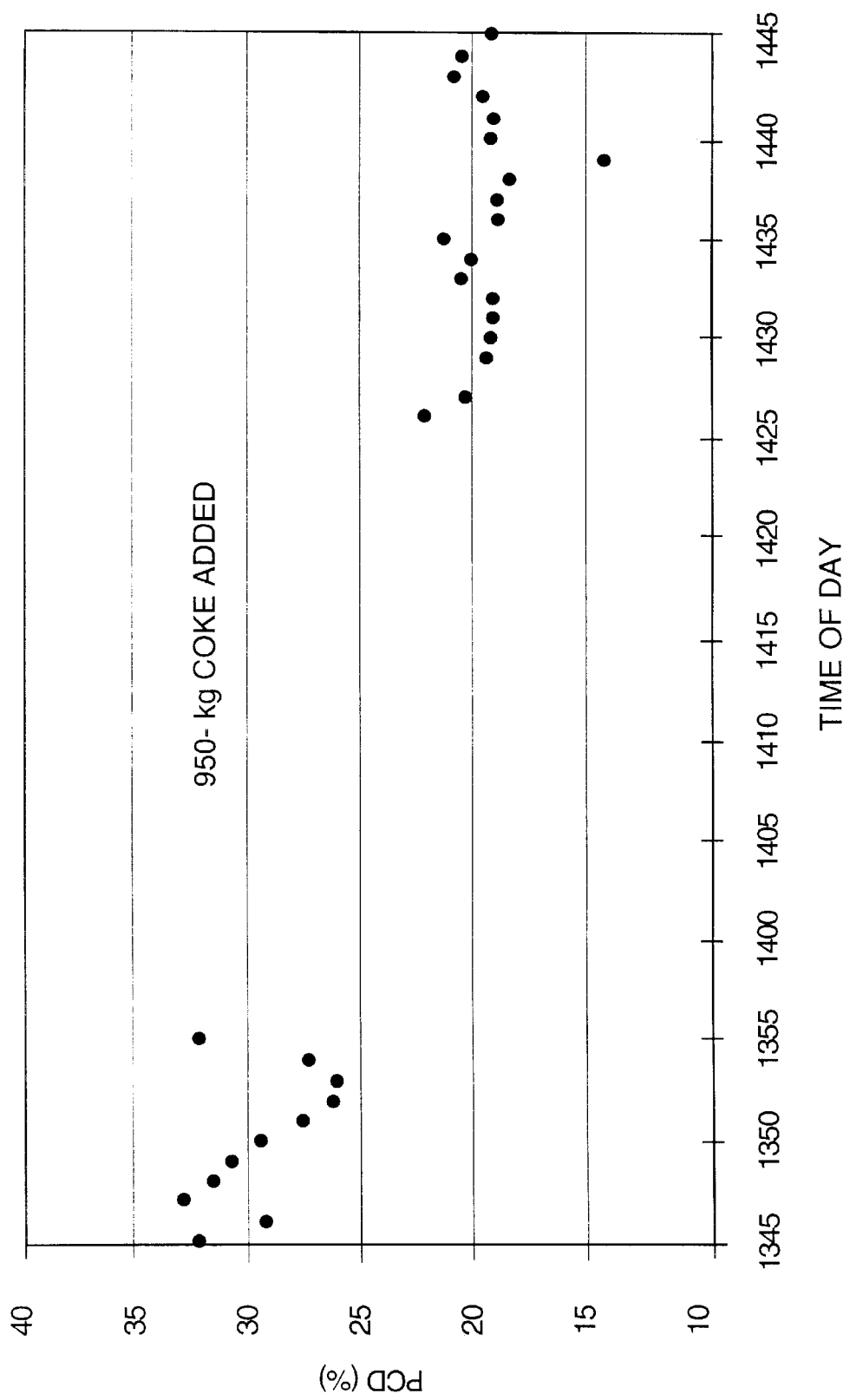
FIG. 11 is a graph illustrating the effect of increased char weight on the offgas post-combustion degree.
Figure 12:
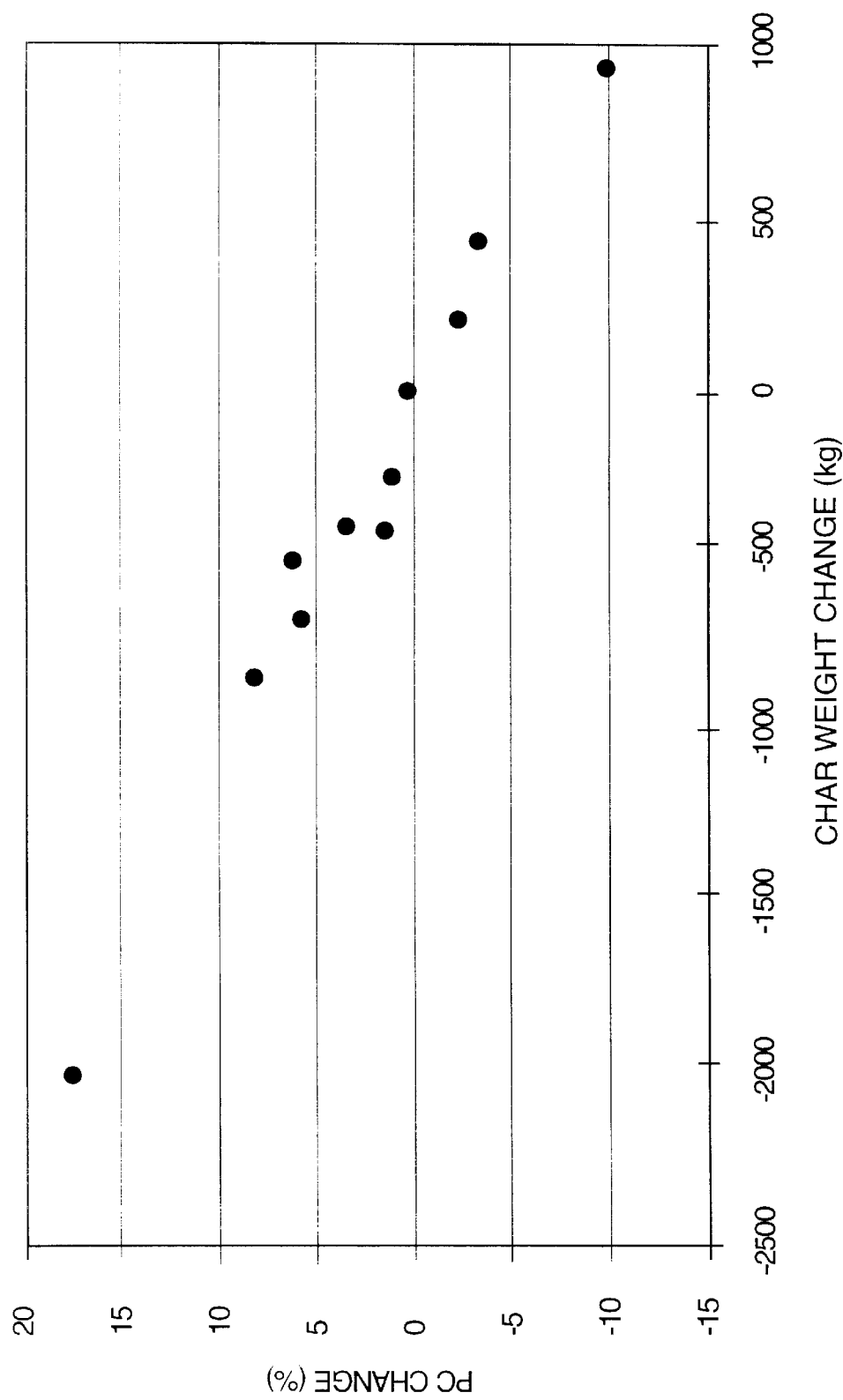
FIG. 12 is a graph illustrating the relationship between the change in char weight and the change in the offgas post-combustion degree.

FIG. 11 shows the results of an experiment conducted to establish the effect of weight of char 28 on the offgas PCD. When operating with a medium volatile coal at about 30% PCD, about 950 kg of coke breeze was added over a 30 minute period. Both the height and temperature of slag 15 were measured prior to the addition of coke breeze. After the coke breeze addition was completed, the height of slag 15, as well as the slag temperature, were again measured. The lance was then repositioned such that the lance gap was the same as that prior to the coke addition. The offgas PCD decreased to about 20%, which was about 10% lower than that prior to the coke addition. Accordingly, in this experiment it was observed that the offgas PCD change was about 1% for 100 kg of excess char. This observation was confirmed in subsequent pilot plant trials and the relationship between the change in the offgas PCD and the change in weight of char 28 is shown in FIG. 12.

The configuration of the central lance tip also has an effect on the offgas PCD levels. During the pilot plant trials, several lance tips were investigated before one was selected for continued use. Preferably, the lance has two separate oxygen circuits, i.e., a primary circuit and a secondary circuit. In one preferred embodiment of the invention, the primary circuits have approximately 3 to 4 nozzles, with an exit angle of approximately 10° to 15° from the vertical axis. The secondary circuits preferably have approximately 6 to 8 nozzles, with exit angles being in the range of approximately 30° to 45° The primary oxygen jets were operating in the sonic or supersonic range, while the secondary oxygen jets were operating in subsonic range. During one trial, the oxygen lance used had four primary nozzles (10° straight bore) and eight secondary nozzles (4@32° and 4@36°). The primary and secondary nozzles were at the same elevation in all lances except one. This lance was termed the "step lance," wherein the secondary nozzles were 60 cm above the primary nozzles. The lance selected for continued use was designed for an oxygen flowrate of around 5500 Nm³/h. The velocity of the primary oxygen jets, at a furnace pressure of approximately 0.7 kg/cm² gauge and a flowrate of 2450 Nm³/h, was estimated to be around Mach 1.15. The velocity of the secondary jets, at a furnace pressure of 0.7 kg/cm² gauge and a flowrate of 3050 Nm³/h, was estimated to be around Mach 0.53.

Some general observations made with respect to the effect of the blowing practice on the offgas PCD are as follows. With "hard" primary jets (velocities greater than Mach 1.5), the maximum offgas PCD obtained was less than 30%. This was presumably due to greater penetration of the primary oxygen jets into the slag 15, such that there was greater oxygen contact with the metal droplets 19 in the metal bath 3. With the use of a step lance, the same PCD levels could be achieved at a lower lance height (note that the lance height in this case is with respect to the location of the primary nozzles).

The information relevant to the offgas post-combustion degree may be used in the following manner to maintain stable operation of the smelter 1. The velocity of the primary oxygen jets is preferably in the sonic range, while that of the secondary jets is preferably subsonic. For a given coal type, the offgas PCD obtainable can be quantified based on the volatile matter input, the char-to-slag weight ratio, and the lance gap. During smelter operation, if the PCD is below that desired, then, based on foam height measurements, the lance can be repositioned in the range required for the desired PCD. If the target PCD is still not achieved, the weight of char 28 in the slag 15 can be changed by altering the coal-to-iron input ratio. The excess or deficiency of char 28 can be confirmed by the slag FeO % content prior to making the change in the material feedrates.

The foaming slag 15 has important implications in the smelting process. Foaming plays a role in determining the required smelter reactor volume for a desired production rate of hot metal 4. Also, it is desirable to maintain a stable foam height, since it affects the post-combustion degree and rate of heat transfer. In addition, operation of the smelter reactor 1 can be temporarily interrupted if the slag 15 foams out of the smelter reactor 1 and into the offgas ducts.

The volume of slag foam was found to be proportional to the volumetric offgas flow rate. Alterna-tively, this may be stated as the height of the foamed slag being proportional to the superficial gas velocity. The foaming phenomenon is represented by the foam index, which is a measure of the travel time of the gas through the slag 15. More specifically, the foam index is defined as the ratio of the foam height to the superficial gas velocity. The foam index has units of time (seconds) and was found to be directly proportional to the viscosity, inversely proportional to the surface tension, and inversely proportional to slag density and bubble diameter.

Figure 13:
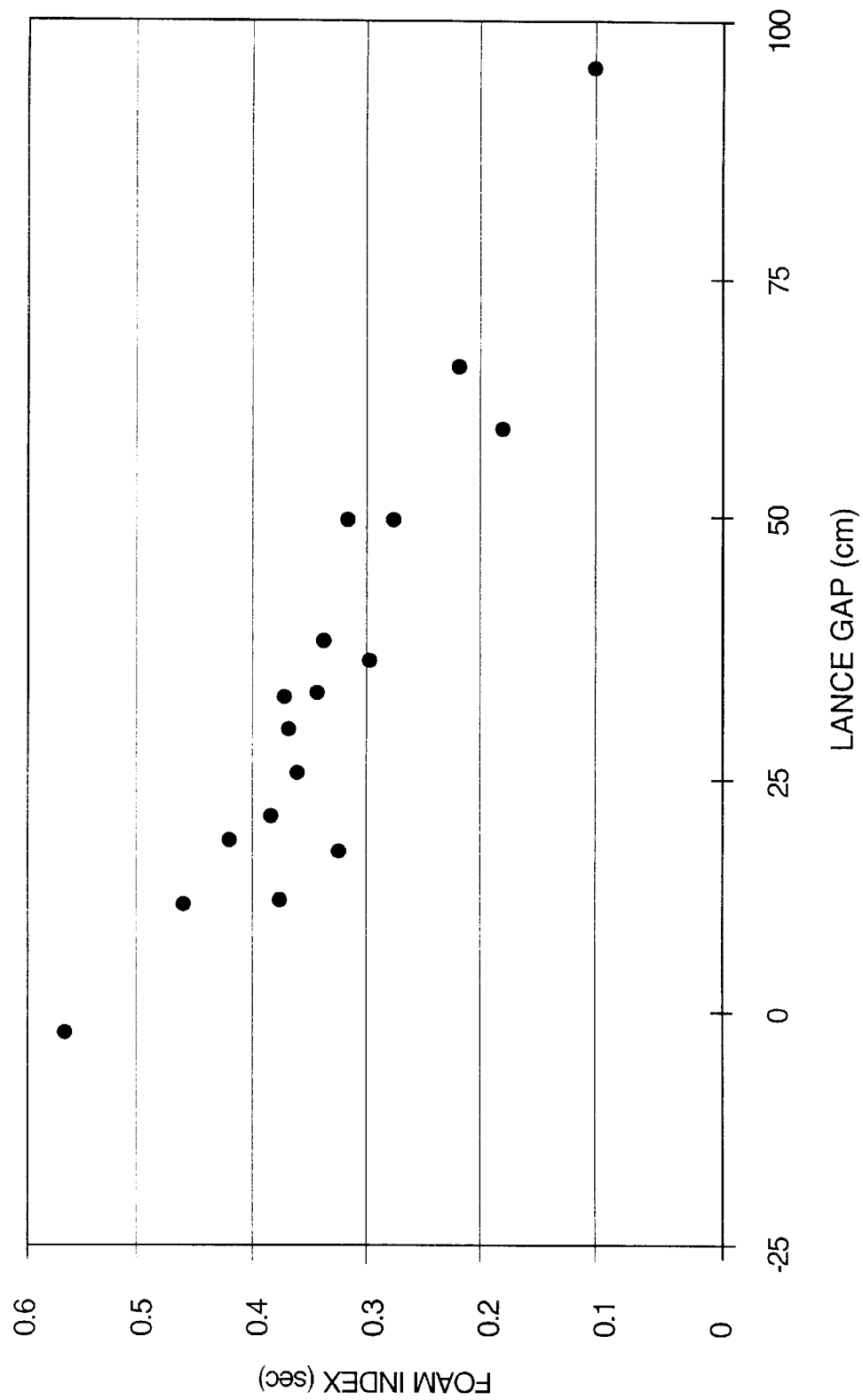
FIG. 13 is a graph illustrating the relationship between the foam index and the lance gap.

During the pilot plant trials, it was found that the foam height varied directly with the superficial gas velocity. Conversely, the foam height was inversely related to the amount of char 28 and the lance gap. In addition, foaming was also found to be affected by the size of char particles 27 and the temperature of slag 15. FIG. 13 shows the relationship between the foam index and the lance gap. As can be seen in FIG. 13, at higher lance gaps, the foam index decreases. This implies that with other conditions being held constant, a lower lance gap results in a higher foam height. This effect can be attributed to additional gas passing through the slag 15 at lower lance gaps. During the pilot plant trials, it was observed that under conditions of excess char 28, the slag foam was relatively suppressed, while little or no char 28 in the slag 15 produced violent slag foaming, with slag 15 being ejected out of the smelter reactor 1 and into the offgas system.

Figure 14:
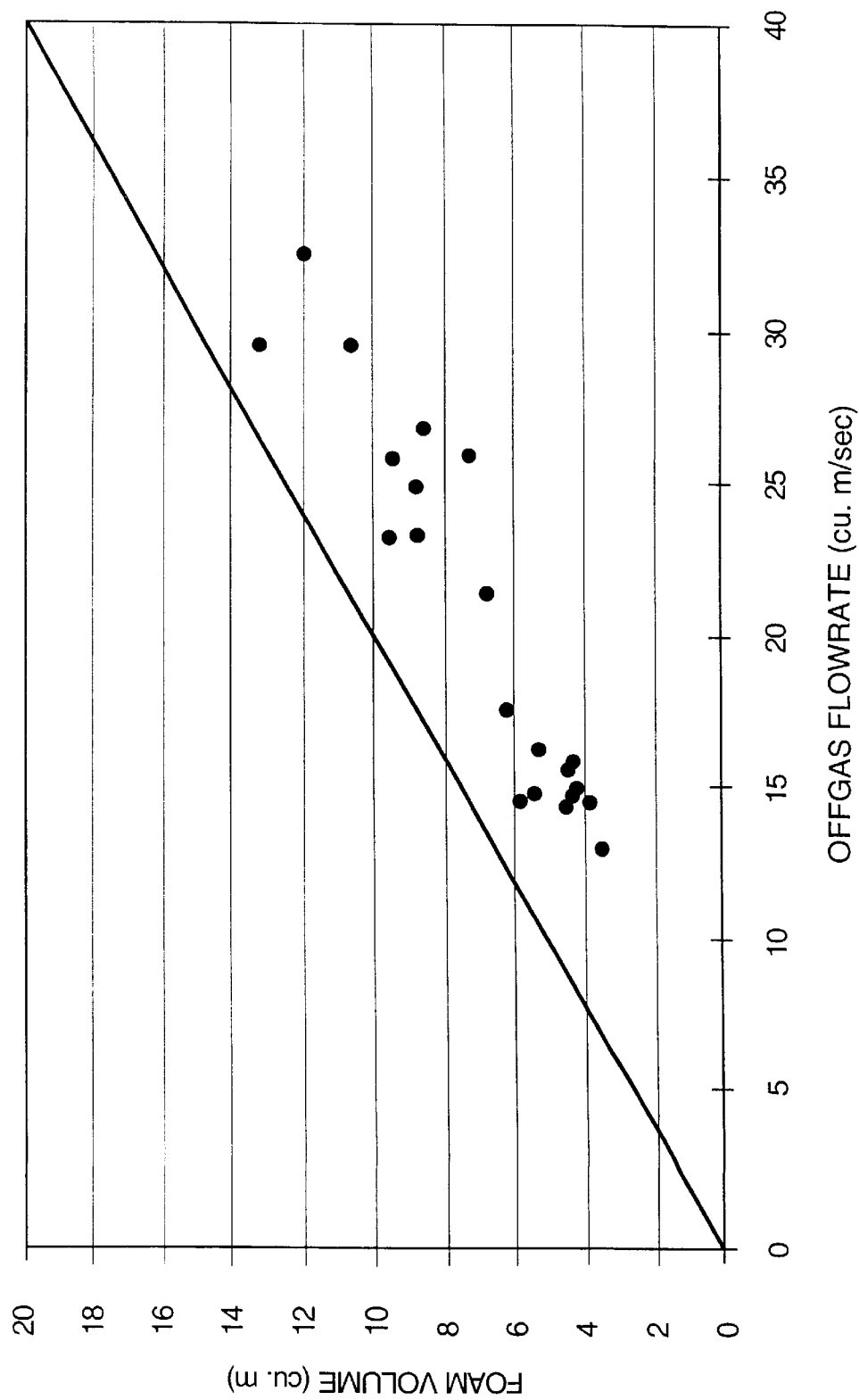
FIG. 14 is a graph illustrating the effect of offgas flowrate on foam volume.
Figure 15A:
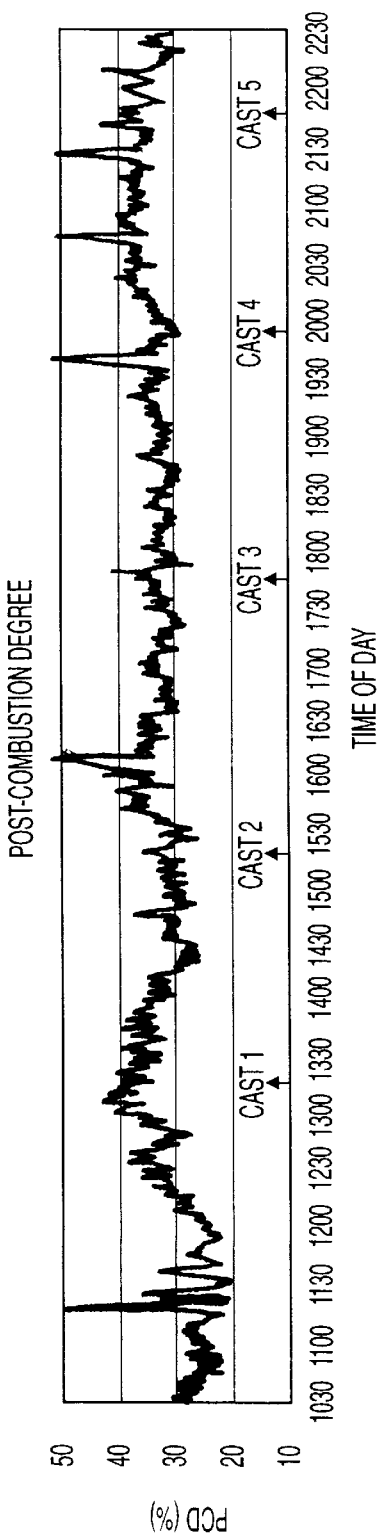
FIG. 15(a) is a graph illustrating the post combustion degree in a smelting operation using medium volume coal, hematite, injected agglomerate D2, and injected blast furnace dust.
Figure 15B:
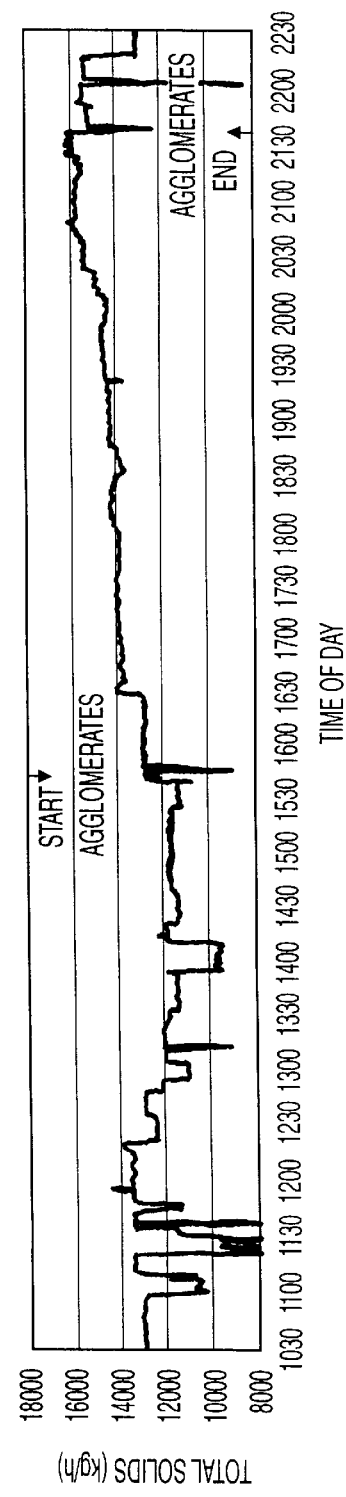
FIG. 15(b) is a graph illustrating the total solid input in a smelting operation using medium volume coal, hematite, injected agglomerate D2, and injected blast furnace dust.
Figure 15C:
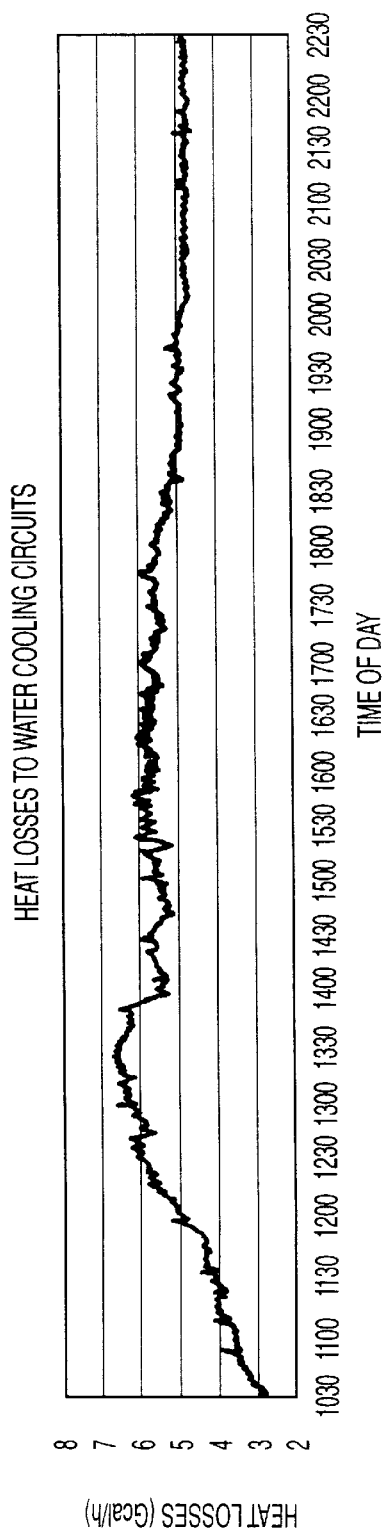
FIG. 15(c) is a graph illustrating the heat losses to water cooling circuits in a smelting operation using medium volume coal, hematite, injected agglomerate D2, and injected blast furnace dust.
Figure 15D:
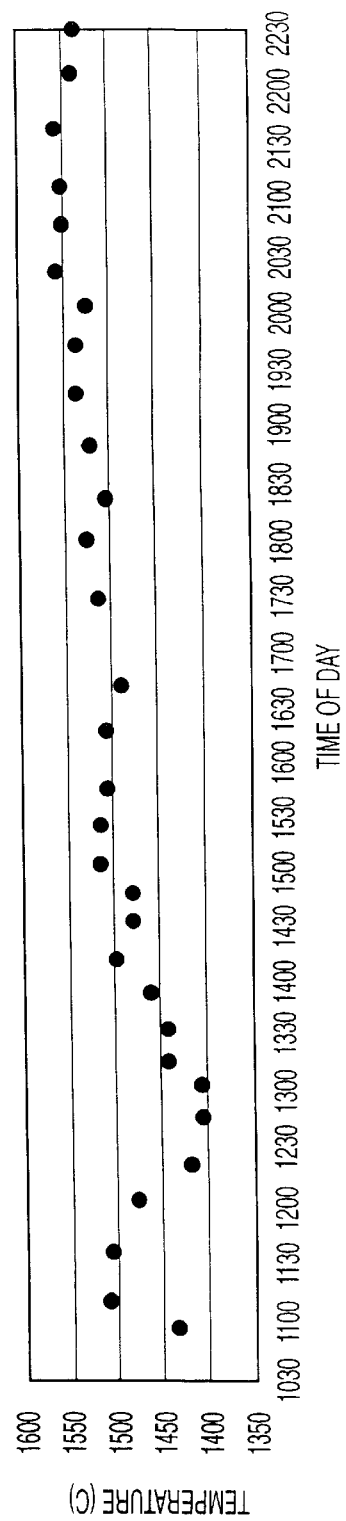
FIG. 15(d) is a graph illustrating the measured sub-lance temperature in a smelting operation using medium volume coal, hematite, injected agglomerate D2, and injected blast furnace dust.

The relationship between the offgas flow rate and the foam volume is shown in FIG. 14 under stable operating conditions. The solid line represents the predicted relationship for a foam index of 0.5 seconds. With proper operating conditions, such as adequate lance gap and char weight, the foam index can be controlled to below 0.5 seconds. The size of the char particles 27 was found to be an important factor in controlling the slag foam. The top-charged coal size used in the smelter was "Stoker Coal". More than 80% (by weight) of the top-charged coal was finer than 1 inch in average diameter, while less than 10% of the coal was finer than ⅛ inch in average diameter. When coke breeze was used as the top-charged fuel, "Pea Coke" was mostly used, with the average size being about ¼ inch in average diameter. When smelter operation was conducted with "Nut Coke," which was much larger in size than the "Pea Coke" variety, slag foaming could not be well controlled, despite maintaining higher than normal char-to-slag weight ratios. The "Nut Coke" had an average diameter in excess of 1 inch. It is believed that the large diameter coal is not conducive to bubble growth and release of gas from the slag 15. In any case, it was clear that large char particles 27 in the slag 15 were not useful in controlling the slag foam.

In several trials, fine coal was injected into the slag 15 through side tuyeres. The injected coal rate was varied with up to 63% (by weight) of the total fuel amount being injected. The injected coal was 100% finer than 2 mm and 50% finer than 0.35 mm. When operating with 40% of the total amount of fuel being injected as fine coal, the slag 15 did not foam out of the smelter reactor 1 when adequate char 28 was present in the slag 15. When the fine coal injection rate was increased to 63% of the total fuel, slopping occurred. This was not due to the lack of char 28 in the slag 15, since the carbon balances showed that the total fuel supply was adequate to maintain the normal amount of char 28. Thus, it was concluded that slopping occurred due to the lack of adequate coarse char. Based on the pilot plant experiments, it was determined that the size of char particles 27 was a factor in controlling the slag foam. The optimum size of char particles 27 can be achieved by charging coarse coal, e.g., "Stoker Coal" that has an average diameter in the range of about ⅛ to about 1 inch. This may result, for example, in an average diameter char size of approximately 6 mm. Fine coal which is 100% finer than 2 mm can, however, be injected, but preferably this will not exceed about 40% of the total fuel input. If coke breeze is the top-charged fuel, then the particle diameter will preferably be approximately 6 mm, which can be obtained by using "Pea Coke". The above information is useful for smelter operation as well as the design of a scaled-up smelter reactor. For a scaled-up smelter reactor, the foam index can be taken to be 0.5 seconds for determining the required volume of smelter reactor 1. Preferably, a volume is estimated that allows for additional volume in the event of process deviations. During operation of the smelter reactor 1, the lance tip is preferably kept at least above the slag surface, such that the foam index is below 0.5 seconds. In addition, it is preferable that the fuel charged to the smelter be such as to result in the average diameter of the char particles 27 being somewhere in the range of about 3 to 9 mm, most preferably about 5 to 7 mm.

As stated earlier, heat generated in the smelter reactor 1 is recovered by heat transfer to the raw material stream, to the slag 15, to the char 28, and to spatter and iron droplets 19. The thermal efficiency in the smelter reactor 1 is dependent on the lance gap, weight of char 28, and blowing practice. Since the thermal efficiency is not a directly measurable quantity, indicators are used to infer the extent of heat recovery. These indicators include the heat losses to the water-cooled regions of the smelter 1, the rate of temperature rise in the thermocouples installed in the refractory bricks 7, the temperature of offgas 31 in the duct, the temperature of hot metal 4, and the thermal efficiency calculated from the heat balance of the process.

The main objective of the control scheme is to maintain stable process operation, while obtaining the maximum possible production rate of hot metal 4 at the minimum possible fuel and oxygen rates. The term "stable operation" refers to substantially consistent PCD, slag FeO content, temperature of hot metal 4, carbon content of hot metal 4, and slag height, such that the slag 15 does not overflow from the smelter reactor and disrupt operation.

During smelter operation, the oxygen blowing rate is typically fixed. Material is charged to the smelter 1 in such a manner that the temperature of hot metal 4 is maintained with the desired range. The energy balance of the process determines the total solid input for a given oxygen blowing rate. The individual coal and ore feedrates are based on the offgas post-combustion degree and the carbon balance. As stated earlier, neither the energy generated nor the weight of char 28 in the slag 15 is a directly measurable parameter. However, based on other process measurements, the state of the process with regard to the energy and materials balance can be deduced.

When process deviations from the target range occur, these primarily result from deviations in the estimated energy balance or the carbon balance. A deviation from the estimated energy balance in the smelter 1 will result in loss of hot metal temperature control, while a deviation from the estimated carbon balance will result in a loss of slag foam control and/or hot metal carbon content control. Process deviations can occur due to malfunctioning sensors and inaccurate estimations of various process parameters.

As stated earlier, the PCD is obtained from the analysis of offgas 31. If the offgas analysis system fails or is working improperly, inaccurate estimations of the quantity of heat generated are produced. Consequently, there can be a loss of temperature control. However, if temperature measurements of hot metal 4 are available on a regular basis, these measurements can be combined with the energy balance to deduce the offgas PCD. Accordingly, a stable process operation can be maintained. Similarly, if the raw material feedrates are not accurately measured, then the total solid input to the smelter will adversely affect the quantity for heat generated. This has the potential to adversely affect the temperature of hot metal 4. However, if the temperature measurements of hot metal 4 using the sub-lance are regularly obtained, the error in the measurements in the total solid input to the smelter 1 can be deduced and appropriate changes can be made.

Deviations in the slag foam height from that desired can occur due to problems with the carbon balance or inadequate control of the amount of slag 15 tapped from the smelter 1. Further errors in the carbon balance can also result if the carbon content in hot metal 4 is below that desired. Errors in the carbon balance can also arise due to incorrect estimation of parameters used in the materials balance, such as the amount of carbon dust, the carbon content in the raw materials, or inaccurate measurement of the material feedrates. Such errors can result in a loss of slag foam control and/or hot metal carbon content control.

If the gas analysis system is not functioning properly, then the carbon balance can not be closed, thereby affecting the amount of char 28 in the slag 15. However, if foam height measurements, slag FeO % measurements, and hot metal temperature measurements are available on a regular basis, it is believed to be possible to deduce the PCD and maintain a stable process operation. Similarly, if the amount of carbon dust is higher than that used in the materials balances, then a decrease in the weight of char 28 will occur. This can be determined from the higher slag FeO % and higher foam height. Appropriate changes to the fuel rate can then be made to return the process to a stable operating mode.

FIGS. 15 through 18 represent operating parameters from a pilot plant trial with top-charged medium volatile coal as the fuel. Hematite pellets and agglomerated steel plant waste oxides were used as the iron-bearing feed 17 in this trial. Type D2 agglomerate waste oxides were charged to the smelters. Further, blast furnace dust was injected into the slag 15. Table 1, below, shows the chemical composition of agglomerate D2 and blast furnace dust.

TABLE 1

Chemistry of Agglomerated and Injected Waste Oxides (wt. %)

| | Agglomerate | | Injected BF Dust |
|---|---|---|---|
| | C | D2 | |
| $SiO_2$ | 5.5 | 5.56 | 6.69 |
| $Al_2O_3$ | 2.37 | 1.32 | 1.66 |
| CaO | 12.18 | 11.73 | 5.23 |
| MgO | 1.35 | 1.74 | 1.44 |
| FeO | 9.42 | 7.27 | 7.63 |
| $Fe_2O_3$ | 50.67 | 55.7 | 45.37 |
| Fe metallic | 1.21 | 1.1 | 1.03 |
| $Na_2O$ | 0.27 | 0.1 | |
| $K_2O$ | 0.46 | 0.23 | |
| ZnO | 1.01 | 4.33 | |
| PbO | 0.11 | 0.023 | |

TABLE 1-continued

Chemistry of Agglomerated and Injected Waste Oxides (wt. %)

| | Agglomerate | | Injected BF Dust |
|---|---|---|---|
| | C | D2 | |
| C | 12.57 | 9.61 | 27.3 |
| S | 0.34 | 0.31 | 0.35 |
| Cl | 0.23 | 0.14 | |
| F | 0.25 | 0.35 | |
| Total Fe | 44.01 | 45.74 | 38.72 |
| Total Gangue | 21.40 | 20.35 | 15.02 |

Figure 16A:
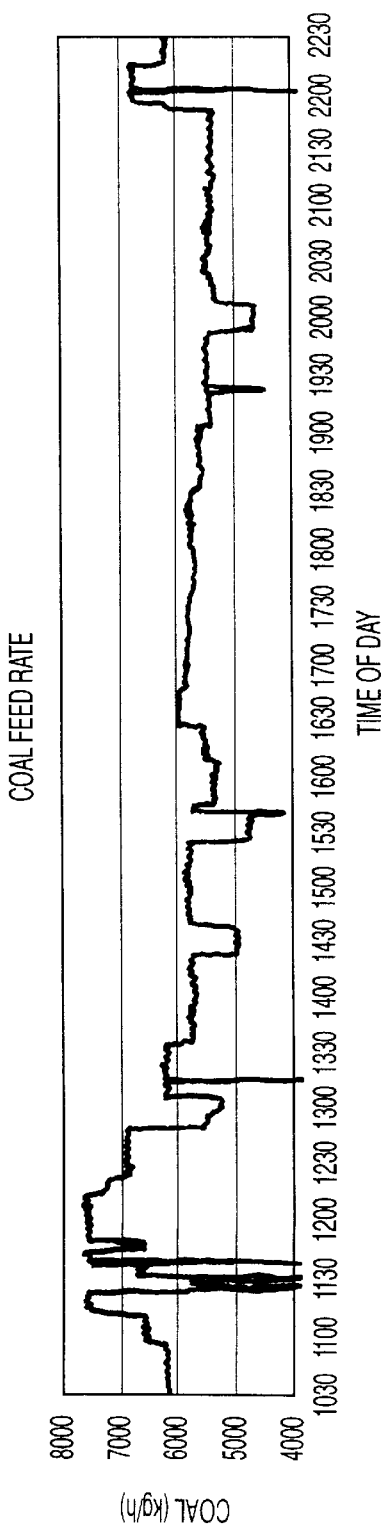
FIG. 16(a) is a graph illustrating the coal feed rate in a smelting operation using medium volatile coal, hematite, injected agglomerate D2, and injected blast furnace dust.
Figure 16B:
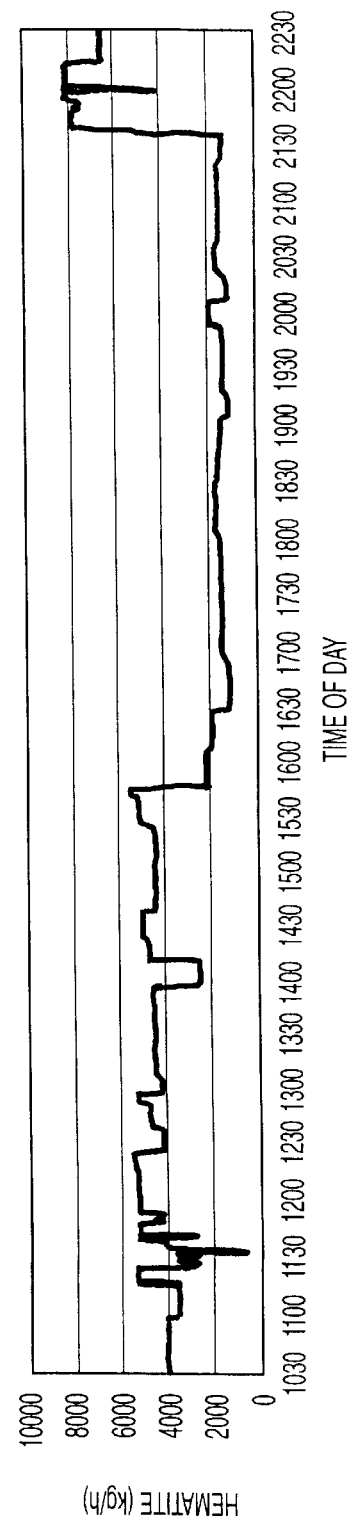
FIG. 16(b) is a graph illustrating the hematite feed rate in a smelting operation using medium volatile coal, hematite, injected agglomerate D2, and injected blast furnace dust.
Figure 16C:
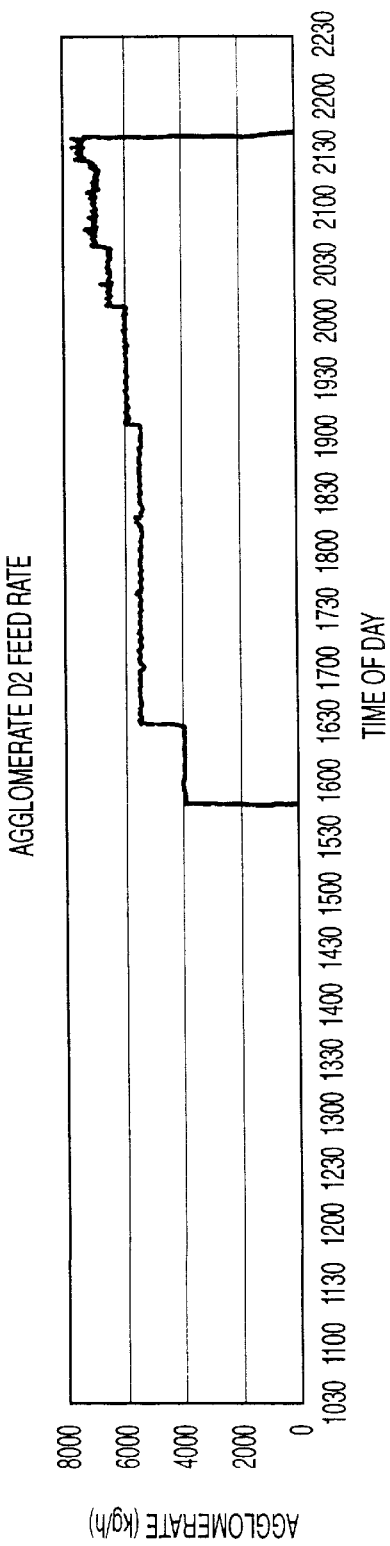
FIG. 16(c) is a graph illustrating the agglomerate D2 feed rate in a smelting operation using medium volatile coal, hematite, injected agglomerate D2, and injected blast furnace dust.
Figure 16D:
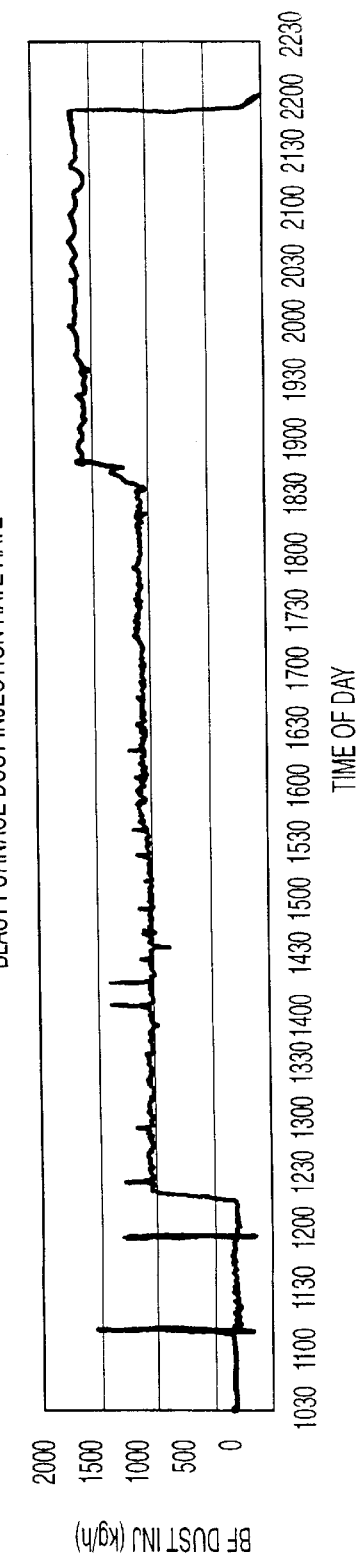
FIG. 16(d) is a graph illustrating the blast furnace dust injection rate in a smelting operation using medium volatile coal, hematite, injected agglomerate D2, and injected blast furnace dust.
Figure 17A:
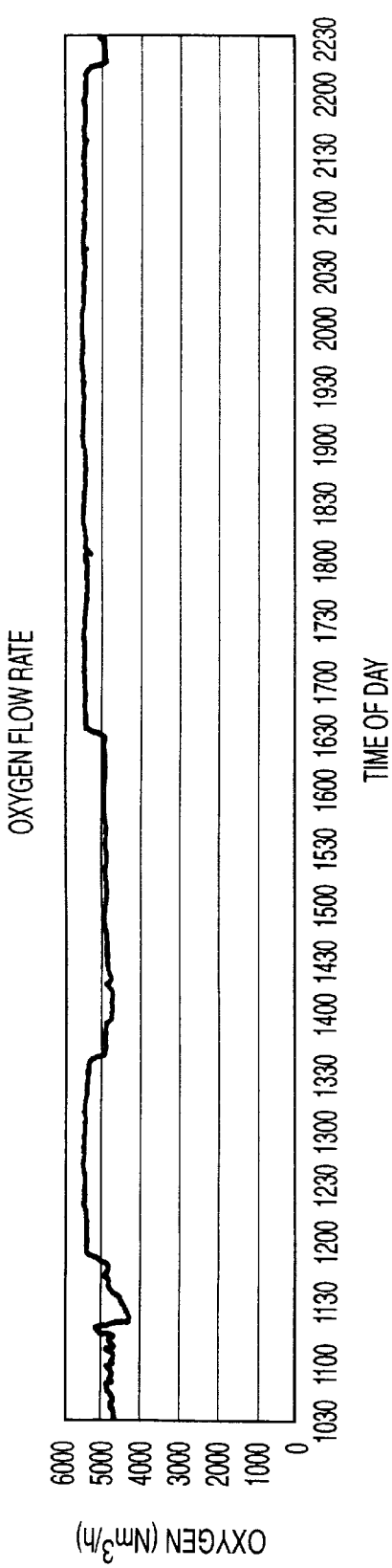
FIG. 17(a) is a graph illustrating the oxygen flow rate in a smelting operation using medium volatile coal, hematite, injected agglomerate D2, and injected blast furnace dust.
Figure 17B:
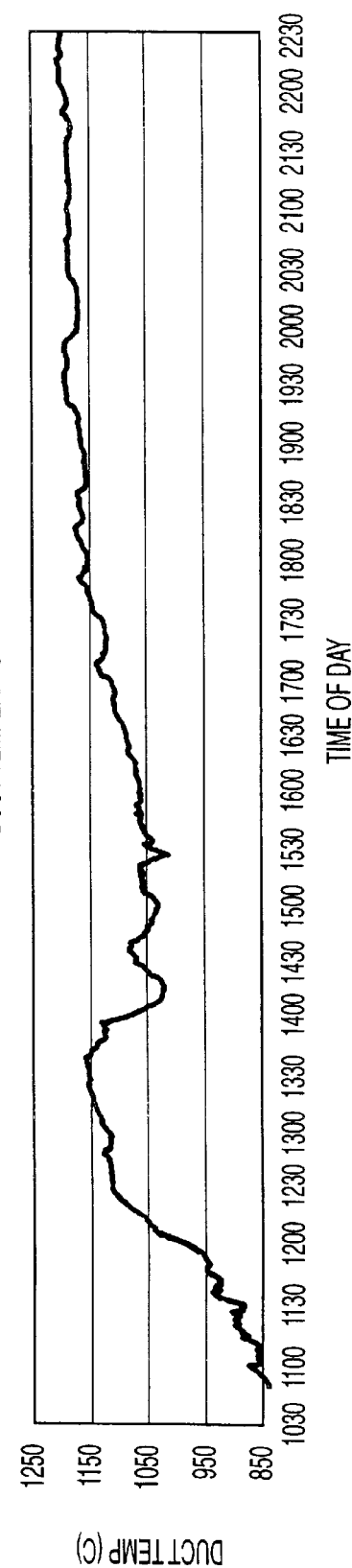
FIG. 17(b) is a graph illustrating the duct temperature in a smelting operation using medium volatile coal, hematite, injected agglomerate D2, and injected blast furnace dust.
Figure 17C:
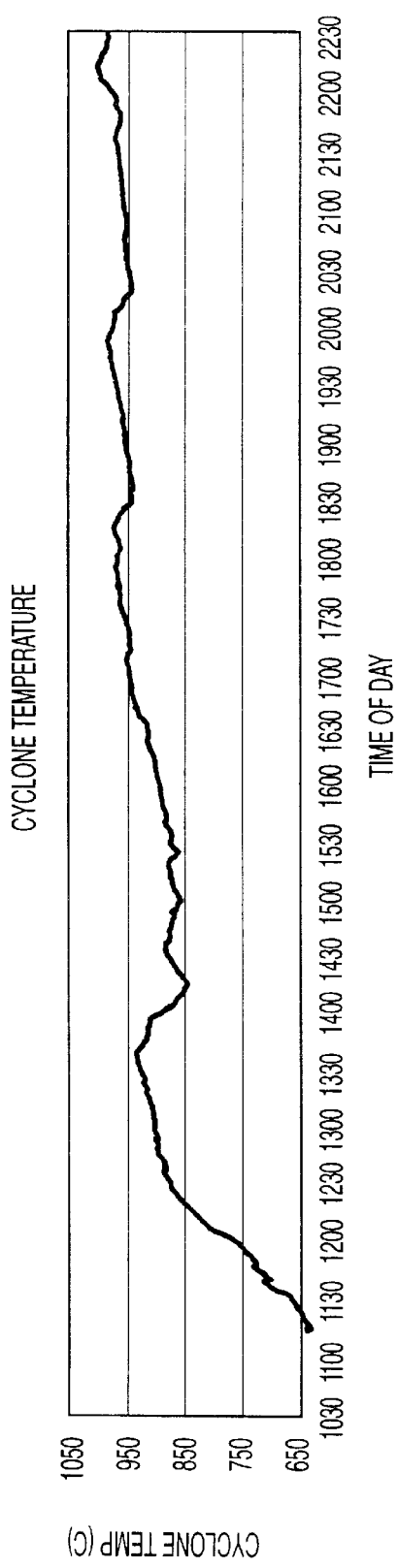
FIG. 17(c) is a graph illustrating the cyclone temperature in a smelting operation using medium volatile coal, hematite, injected agglomerate D2, and injected blast furnace dust.
Figure 17D:
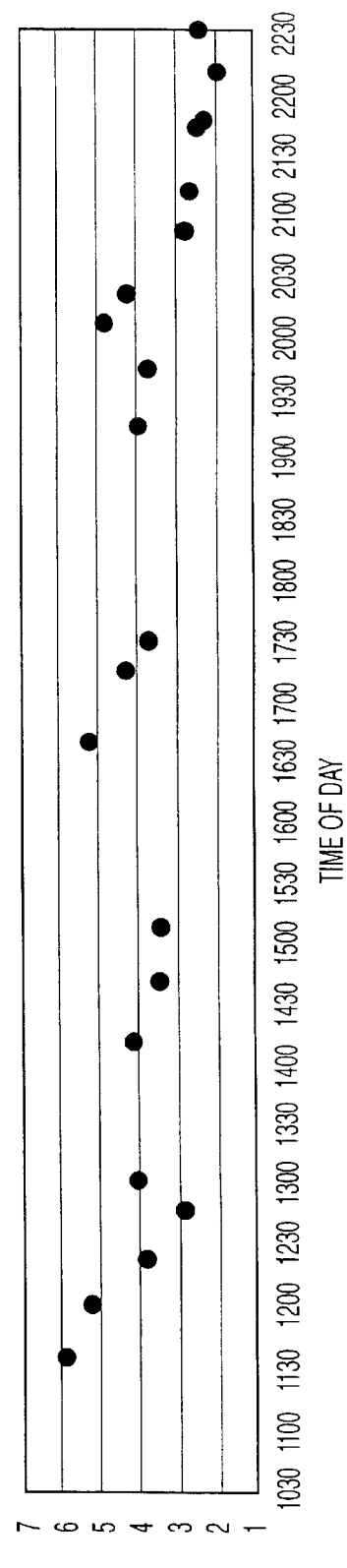
FIG. 17(d) is a graph illustrating the FeO % (weight) in a smelting operation using medium volatile coal, hematite, injected agglomerate D2, and injected blast furnace dust.
Figure 18A:
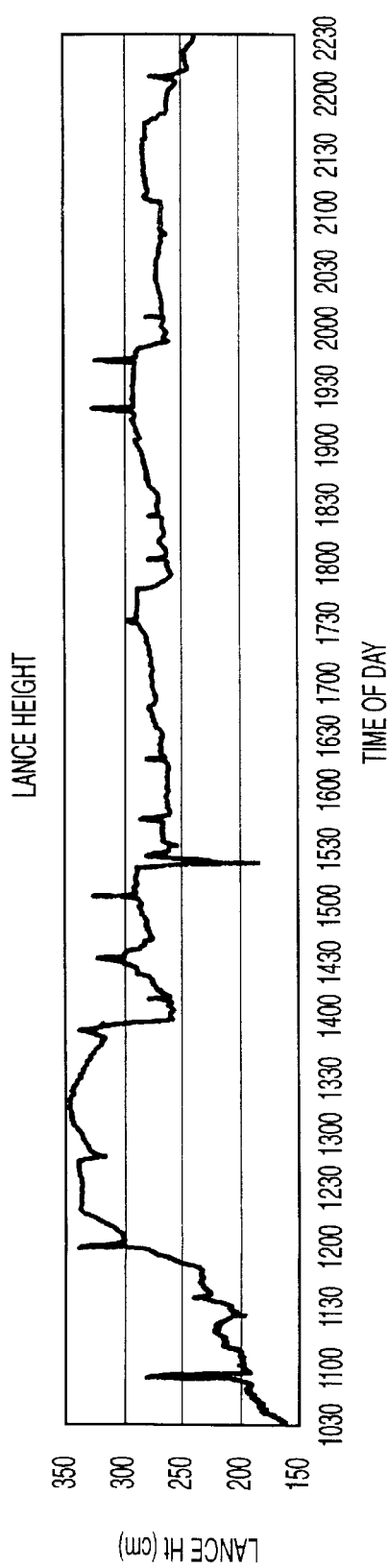
FIG. 18(a) is a graph illustrating the lance height in a smelting operation using medium volatile coal, hematite, injected agglomerate D2, and injected blast furnace dust.
Figure 18B:
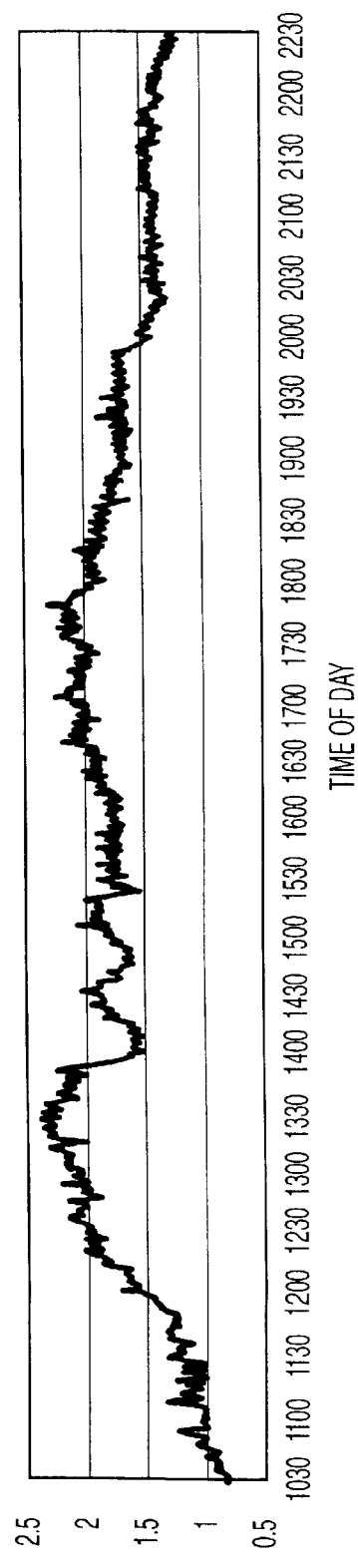
FIG. 18(b) is a graph illustrating the heat losses to the water cooled hood in a smelting operation using medium volatile coal, hematite, injected agglomerate D2, and injected blast furnace dust.
Figure 18C:
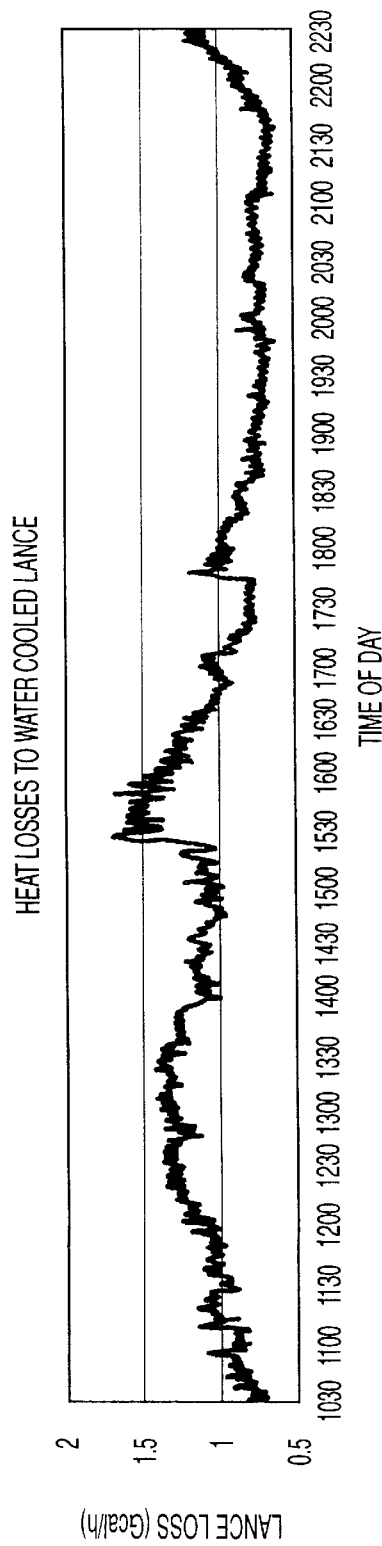
FIG. 18(c) is a graph illustrating the heat losses to the water cooled lance in a smelting operation using medium volatile coal, hematite, injected agglomerate D2, and injected blast furnace dust.
Figure 18D:
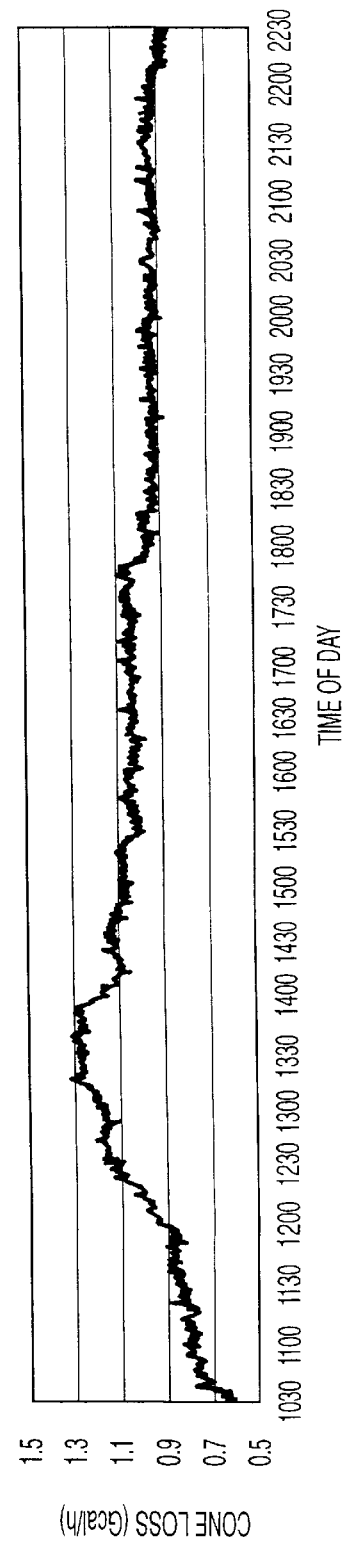
FIG. 18(d) is a graph illustrating the heat losses to the water cooled cone in a smelting operation using medium volatile coal, hematite, injected agglomerate D2, and injected blast furnace dust.
Figure 19A:
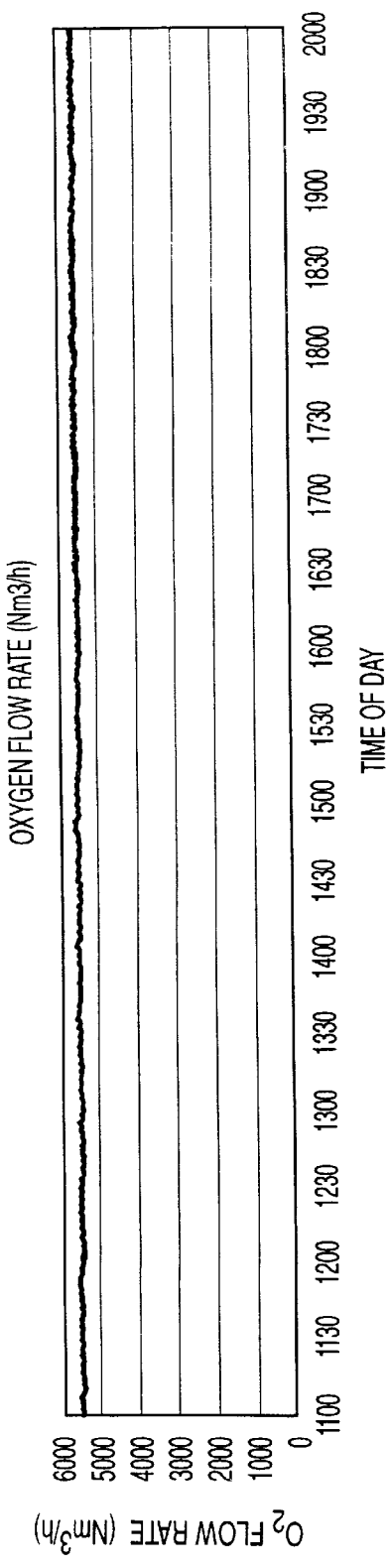
FIG. 19(a) is a graph illustrating the oxygen flow rate in a smelting operation using coke breeze, hematite, and injected agglomerate C.
Figure 19B:
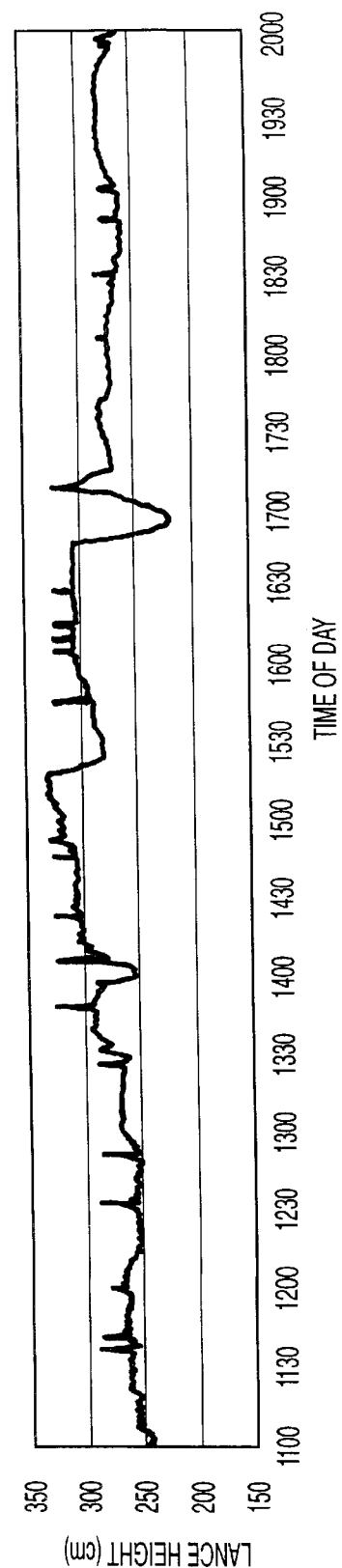
FIG. 19(b) is a graph illustrating the lance height in a smelting operation using coke breeze, hematite, and injected agglomerate C.
Figure 19C:
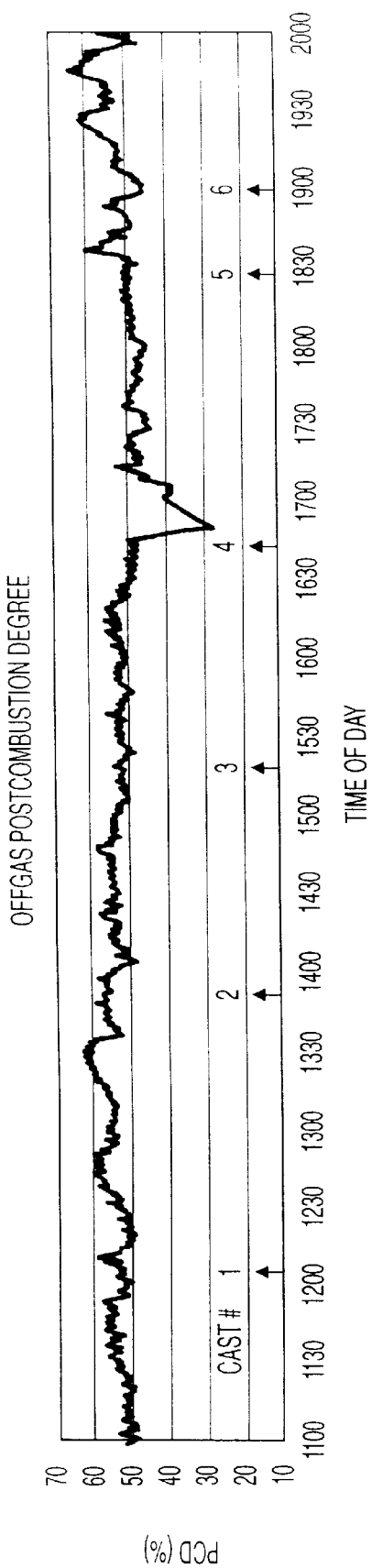
FIG. 19(c) is a graph illustrating the offgas post-combustion degree in a smelting operation using coke breeze, hematite, and injected agglomerate C.
Figure 19D:
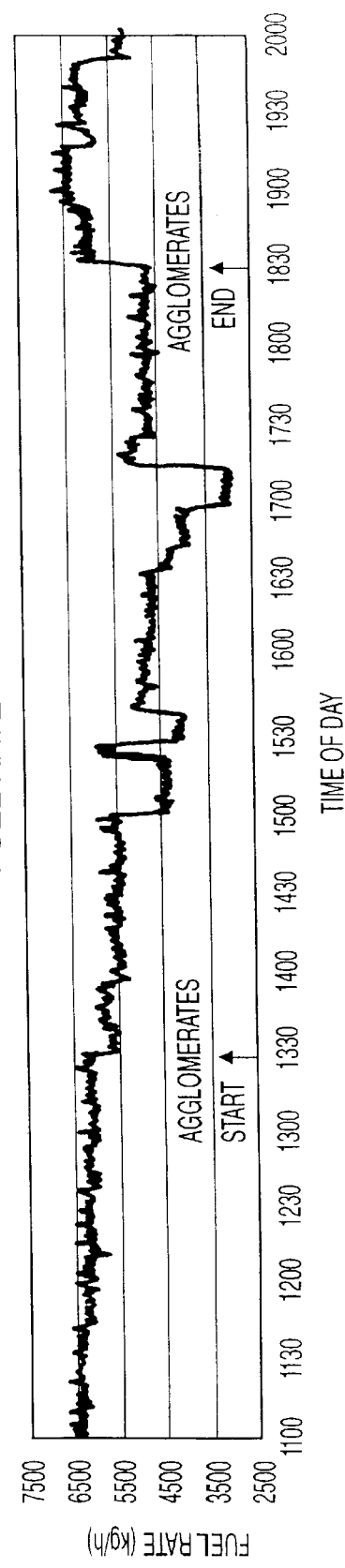
FIG. 19(d) is a graph illustrating the fuel rate in a smelting operation using coke breeze, hematite, and injected agglomerate C.

FIGS. 15(a) through 15(d) show the offgas post-combustion degree, the total solid input, the total heat losses to the cooling water circuits, and the measured sub-lance temperature. During the early part of the trial run (between 1230 and 1330 hours), the temperature of hot metal 4 was below the target range of 1500° C. to 1550° C. After the lining of smelter reactor 1 was soaked out and the heat losses steadied, temperature control of hot metal 4 was much easier and the degree of control is demonstrated by the measurements. The lance height, as well as the heat losses to the individual water cooling circuits, are shown in FIGS. 18(a) through 18(d). From FIG. 15(a), it can be seen that the post-combustion degree was raised from about 30% to nearly 40% at around 2000 hours. The FeO % content of the slag 15, shown in FIG. 17(d), was below 4% prior to 2000 hours. Since the slag FeO % was well below that which was deemed to be tolerable, it was decided to decrease the weight of char 28. This was accomplished by decreasing the feed rate of coal 25 and increasing the feed rate of the iron-bearing materials 17, as is shown in FIGS. 16(a) and 16(b). After the PCD stabilized at the new level, the total solid input was gradually increased, while maintaining the temperature of hot metal 4. (See FIGS. 15(b) and 15(d).) The additional solid input was possible due to the higher heat generation at the new PCD level.

FIGS. 19 and 20 illustrate operating parameters during a pilot plant trial with top-charged coke breeze as the fuel source. Hematite pellets and agglomerated steel plant waste oxides were used as the iron bearing feed 17 in this trial. Type C agglomerate waste oxides were charged to the smelter 1. Table 1, above, shows the chemical composition of agglomerate C. The oxygen flowrate, lance height, offgas post-combustion degree, and fuel rate are shown in FIGS. 19(a) through 19(d). The offgas PCD was above 50% for most of the trial, except for a brief period following the fourth cast. During this cast, about 7.3 tonnes of slag was cast, which is almost twice the normal amount. Since char 28 was not cast along with the slag 15, the char-to-slag ratio increased substantially, which resulted in a decrease in the PCD. At this time, it was decided to decrease the weight of char 28 by lowering the coke breeze feed rate, as can be seen in FIG. 19(d). Shortly thereafter, the PCD returned to its original level. The variation in the slag FeO % before and after the fourth cast can be seen in FIG. 20(c). The increase in the temperature of offgas after the fourth cast is also depicted in FIG. 20(d).

Figure 20A:
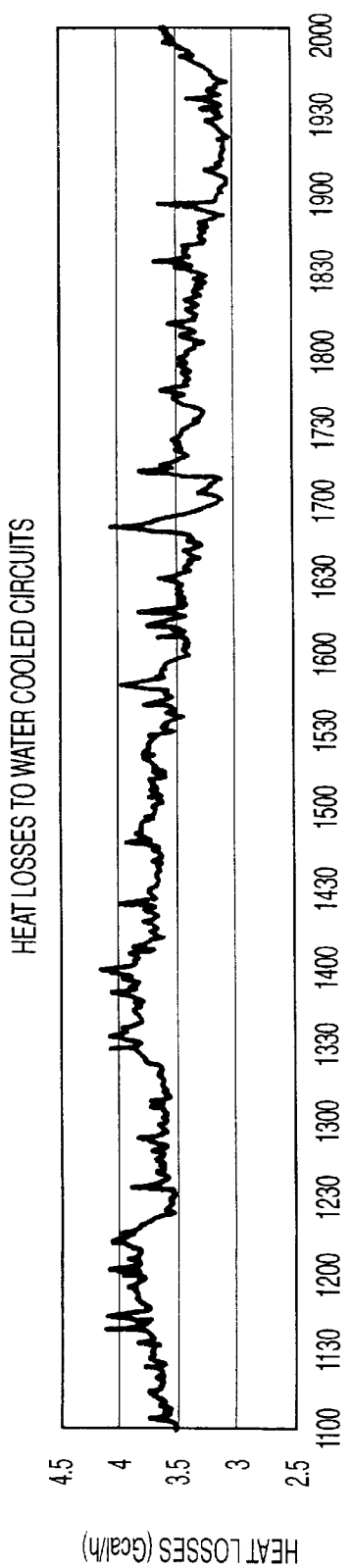
FIG. 20(a) is a graph illustrating the heat losses to water cooled circuits in a smelting operation using coke breeze, hematite, and injected agglomerate C.
Figure 20B:
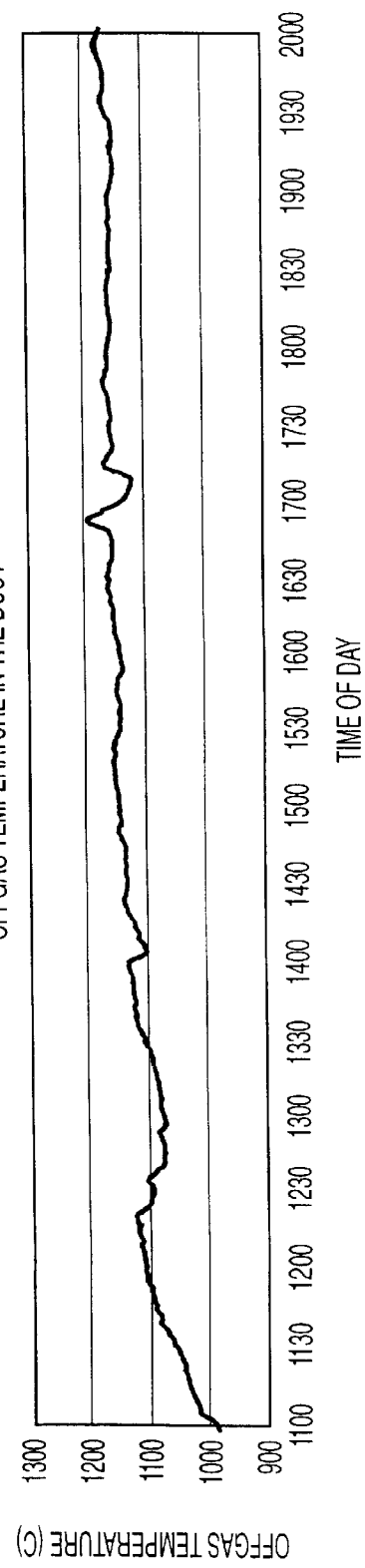
FIG. 20(b) is a graph illustrating the offgas temperature in the duct in a smelting operation using coke breeze, hematite, and injected agglomerate C.
Figure 20C:
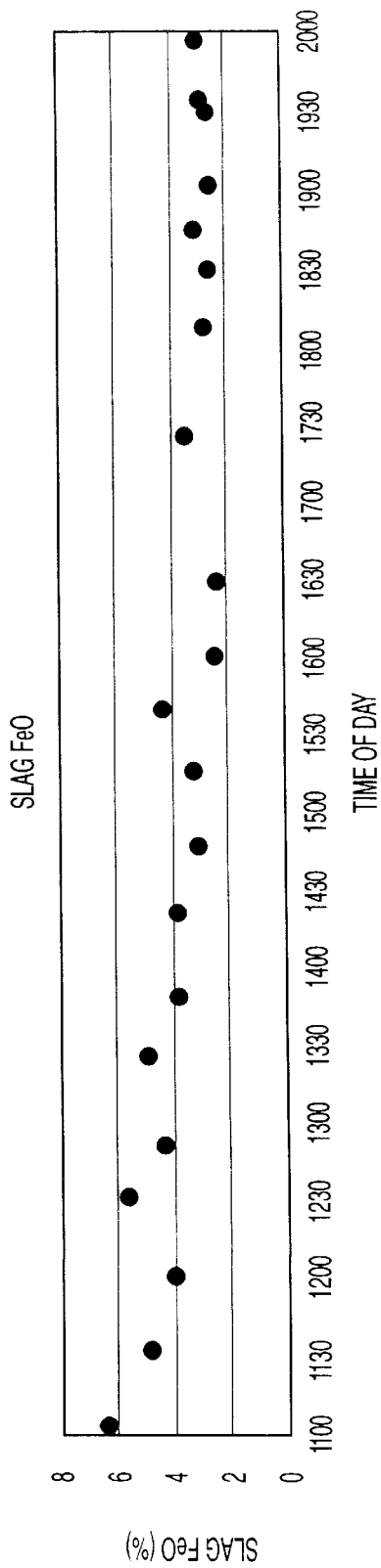
FIG. 20(c) is a graph illustrating the slag FeO % content in a smelting operation using coke breeze, hematite, and injected agglomerate C.
Figure 20D:
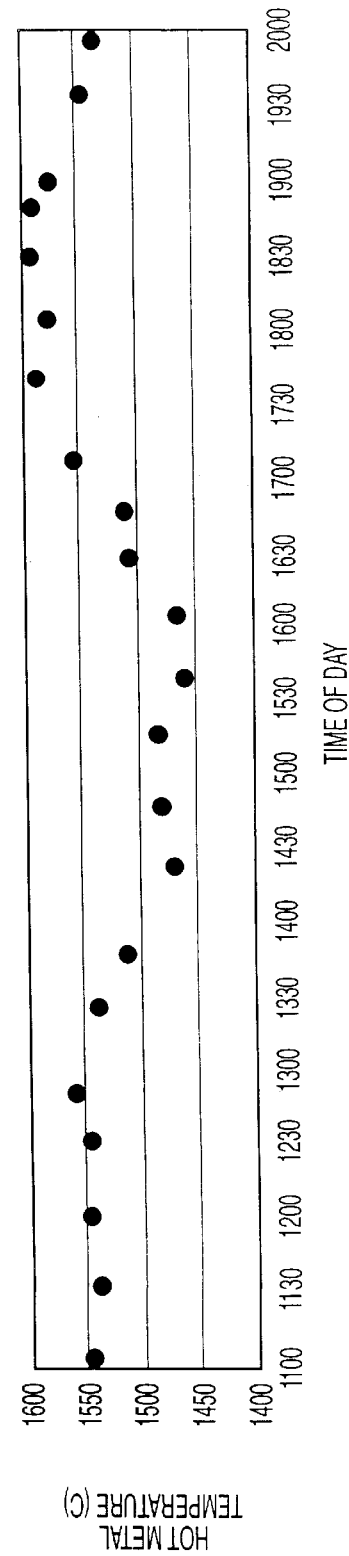
FIG. 20(d) is a graph illustrating the hot metal temperature in a smelting operation using coke breeze, hematite, and injected agglomerates.

In FIG. 20(d), the temperature of hot metal 4 can be seen to decrease after the addition of agglomerated waste oxides began. After a few sub-lance temperature measurements were taken, the deviation corrected, which resulted in the stabilization of the temperature at the new level. The increase in the temperature of hot metal 4 after the fourth cast was a result of a change in the energy balance due to the variations in the PCD. Compensation of solid input to the smelter 1 lagged by a short time period, resulting in the temperature of hot metal 4 taking a little longer to stabilize.

Although applicants have obtained this information during pilot plant trials, the data are believed to be equally applicable to any scaled-up operation. For instance, the residence times of various parameters indicate that the data obtained are applicable to commercial operations. Accordingly, it is worthwhile to review the mean residence time of some of the process parameters. This is indicative of the rate at which phenomena occur in the smelter 1. The mean residence time is defined as the time required to process one volume of feed measured under specified conditions. This is mathematically expressed as: $t_r=V/V_o$ where $t_r$ is the mean residence time, V is the volume of the material present in the smelter 1, and $V_o$ is the volumetric feedrate of the material to the smelter reactor 1.

Example mean residence time calculations were conducted for operations with top-charged low volatile coal and hematite ore. The coal input was 7850 kg/h, while the ore feedrate was 9246 kg/h. The PCD was taken to be around 35%. The mean residence times calculated for FeO, carbon, and the offgas 31 in the smelter reactor 1 are discussed below.

The FeO input to the smelter 1 is calculated assuming the iron ore contains 87.48% $Fe_2O_3$ and 5% $H_2O$. Assuming FeO losses of around 5% of the total input, the amount of FeO actually entering the smelter reactor can be calculated to be 6761 kg/h. For a slag weight of 7 tons, containing 5% FeO, the amount of FeO present in the smelter reactor 1 is 350 kg. If this amount of FeO is to be maintained, the mean residence time is be calculated to be 3.1 minutes. The mean residence time varies directly with the weight of slag 15 and FeO content, and varies inversely with the amount of FeO lost as dust. For example, if there were no FeO losses, then the mean residence time is 2.95 minutes. Clearly, the mean residence time of FeO in the smelter reactor 1 is small.

The carbon input to the smelter is calculated assuming coal contains 69.86% fixed carbon and 2.15% moisture. Assuming fixed carbon losses of around 7.5%, the amount of fixed carbon that actually enters the smelter reactor 1 is calculated to be 4964 kg/h. If 1200 kg of char 28, assumed to be fixed carbon, is to be maintained in the smelter reactor 1, then the mean residence time for fixed carbon is calculated to be 14.5 minutes. The mean residence time for carbon also varies inversely with the fixed carbon losses from the system. If there were no fixed carbon losses as dust, the mean residence time is calculated at 13.4 minutes. It is clear that the mean residence for fixed carbon is higher than that for iron oxide.

The offgas flowrate from the process for the above mode of operation is around 14750 $Nm^3/h$. At a temperature of 1650° C. and a pressure of 1.5 atm, this corresponds to a volumetric gas flowrate of around 19.24 $m^3/s$. The total smelter reactor volume is 22.5 $m^3$. Therefore, the residence time of the process gas is 1.17 seconds, if the entire smelter reactor volume is taken into account.

During operation, the process temperature can vary over a 50 Centigrade degrees range in a one-hour period. For 24 tonnes of metal 4 and 7 tonnes of slag 15 a 50 Centigrade degrees increase corresponds to an increased sensible heat of 0.36 Gcal/h. The total heat generated for the above mode of operation is 20.15 Gcal/h. The change in sensible heat of the metal 4 and slag 15 is equal to 1.8% of the total heat generated. The above mode of operation assumes a PCD of around 35%.

The low mean residence times for process variables indicate that the various process phenomena occur rapidly. This is not surprising, since the chemical reactions are occurring in the liquid state, wherein heat and mass transfer take place at an enhanced rate. Consequently, the analysis and interpretation of pilot plant data that were collected during trials conducted for a relatively short duration are considered adequate for extrapolation to larger smelter reactors operating continuously for longer periods of time.

We claim:

1. In a process of producing molten iron that comprises the steps of:
   a) introducing a source of iron oxide, flux, oxygen, nitrogen, and a source of carbon and hydrogen to a smelter reactor, at least some of said oxygen being continuously introduced through an overhead lance;
   b) maintaining conditions in said smelter reactor to cause (i) at least some of the iron oxide to be chemically reduced, (ii) a bath of molten iron to be created and stirred in the bottom of the smelter reactor, surmounted by a layer of foaming, FeO-containing slag, and (iii) carbon monoxide and hydrogen gas to rise through the slag;
   c) causing at least some of said carbon monoxide and hydrogen to react in the smelter reactor with the incoming oxygen, thereby generating heat for reactions taking place in the smelter reactor;
   d) releasing from the smelter reactor an offgas that contains CO, $CO_2$, $H_2$, and $H_2O$; and
   e) removing at least some of said molten iron and slag from the smelter reactor,
   the improvement comprising the following steps:
   f) repeatedly measuring, during the process, the conditions of the slag height, the temperature of the molten iron, the content of CO, $CO_2$, $H_2$, and $H_2O$ in the offgas, the carbon content of the molten iron, and the FeO content in the slag, and
   g) subsequently adjusting one or more process variables so as to help keep one or more of said process conditions within a range.

2. A process according to claim 1, wherein, in step (g), said process variable or variables are selected from the group consisting of (i) the addition rate of the carbon and hydrogen source, (ii) the addition rate of the source of iron oxide, (iii) the addition rate of flux, (iv) the addition rate of oxygen, (v) the height of the oxygen lance relative to the slag, (vi) the rate at which the bath of molten iron is stirred, and (vii) the rate at which molten iron and slag are removed from the smelter reactor.

3. A process according to claim 2, wherein the height of the oxygen lance relative to the slag is located such that the foam index is less than 0.5 second.

4. A process according to claim 1, wherein, in step (f), the measurements of the content of CO, $CO_2$, $H_2$, and $H_2O$ in the offgas are used to determine to what extent, in step (c), carbon monoxide and hydrogen are reacting with oxygen.

5. A process according to claim 4, wherein, after said determination is made, the extent of reaction of carbon monoxide and hydrogen with oxygen in step (d) is altered by adjusting one or more process variables selected from the group consisting of (i) the height of the oxygen lance relative to the slag, (ii) the system pressure, and (iii) the rate of addition of the carbon and hydrogen source.

6. A process according to claim 1, wherein said source of carbon and hydrogen comprises one or more materials selected from the group consisting of coke breeze, low volatile coal, medium volatile coal, and high volatile coal.

7. A process according to claim 6, wherein the source of carbon and hydrogen charged to the smelter reactor comprises a particulate material having an average diameter within the range of about 1/8 inch to about 1 inch.

8. A process according to claim 1, wherein the source of carbon and hydrogen charged to the smelter reactor comprises fine coal and non-fine coal, wherein the amount of fine coal charged to the smelter reactor does not exceed 40% of the combined weight of the fine coal and non-fine coal, on a dry weight basis, said non-fine coal having an average diameter within the range of about 1/8 inch to about 1 inch.

9. A process according to claim 7, wherein the source of carbon and hydrogen produces in the reactor a char with an average diameter within the range of about 3 mm to about 9 mm.

10. A process according to claim 2, wherein, in step (a), the source of carbon and hydrogen is introduced at a rate that maintains a char concentration in the slag in the range of about 15 to 35 percent, on a dry weight basis.

11. A process according to claim 1, wherein, during the process, the desired weight of slag for the particular size smelter reactor being used, in conjunction with the particular char size and char-to-slag weight ratio being used, is determined by performing the steps of:

i) measuring the FeO weight percentage of the slag;

ii) measuring the oxygen removal rate from the smelter reactor;

iii) determining the ratio of the oxygen removal rate to slag weight that corresponds to the FeO % in the slag; and iv) calculating the desired slag weight based on said measured oxygen removal rate and the ratio of said oxygen removal rate to slag weight.

12. In a process of producing molten iron that comprises the steps of:

a) introducing a source of iron oxide, flux, oxygen, nitrogen, and a source of carbon and hydrogen selected from the group consisting of coke breeze, low volatile coal, medium volatile coal, and high volatile coal to a smelter reactor, at least some of said oxygen being continuously introduced through an overhead lance;

b) maintaining conditions in said smelter reactor to cause (i) at least some of the iron oxide to be chemically reduced, (ii) a bath of molten iron to be created and stirred in the bottom of the smelter reactor, surmounted by a layer of foaming FeO-containing slag, and (iii) carbon monoxide and hydrogen gas to rise from the slag;

c) causing at least some of said carbon monoxide and hydrogen to react in the smelter reactor with the incoming oxygen, thereby generating heat for reactions taking place in the smelter reactor;

d) releasing from the smelter reactor an offgas that contains CO, $CO_2$, $H_2$, and $H_2O$; and e) removing at least some of said molten iron and slag from the smelter reactor, the improvement comprising the following steps:

f) maintaining the height of the oxygen lance relative to the slag such that the foam index is less than 0.5 second;

g) repeatedly measuring during the process the conditions of the slag height, the temperature of the molten iron, the content of CO, $CO_2$, $H_2$, and $H_2O$ in the offgas, the carbon content of the molten iron, the FeO content in the slag, and the degree of slag foaming; and h) subsequently adjusting one or more process variables so as to help keep one or more of said process conditions within a range, wherein said process variable or variables are selected from the group consisting of (i) the addition rate of the carbon and hydrogen source, (ii) the addition rate of iron oxide, (iii) the addition rate of flux, (iv) the addition rate of oxygen, (v) the height of the oxygen lance relative to the slag, (vi) the rate at which the bath of molten iron is stirred, and (vii) the rate at which molten iron and slag are removed from the smelter reactor.

13. A process according to claim 12, wherein, in step (a), the source of carbon and hydrogen is introduced at a rate that maintains a char concentration in the slag in the range of about 15 to 35 percent, on a dry weight basis.

14. A process according to claim 13, wherein, in step (h), the adjusting is done to help keep the slag height to more than 1 meter below the cone of the smelter reactor.

15. A process according to claim 13, wherein, in step (h), the adjusting is done to help keep the temperature of the molten iron within the range of approximately 1450° C. to approximately 1550° C.

16. A process according to claim 13, wherein, in step (h), the adjusting is done to help keep the carbon content of the molten iron within the range of approximately 4% to approximately 4.5% (weight basis).

17. A process according to claim 13, wherein, in step (h), the adjusting is done to help keep the FeO content in the slag within the range of approximately 2% to approximately 5% (weight basis).

18. A process according to claim 13, wherein, in step (h), the adjusting is done to help keep the post-combustion degree in the offgas within the range of approximately 30% to approximately 60%.

19. A process according to claim 18, wherein the source of carbon and hydrogen used produces in the reactor a char with an average diameter within the range of about 3 mm to about 9 mm.

20. A process according to claim 14, wherein, in step (h), the adjusting is done to help keep the temperature of the molten iron within the range of approximately 1450° C. to approximately 1550° C.

21. A process according to claim 20, wherein, in step (h), the adjusting is done to help keep the carbon content of the molten iron within the range of approximately 4% to approximately 4.5% (weight basis).

22. A process according to claim 21, wherein, in step (h), the adjusting is done to help keep the FeO content in the slag within the range of approximately 2% to approximately 5% (weight basis).

23. A process according to claim 22, wherein, in step (h), the adjusting is done to help keep the post-combustion degree in the offgas within the range of approximately 30% to approximately 40% when coal is used as the majority (dry weight basis) of the source of carbon and hydrogen, and within the range of approximately 50% to approximately 60% when coke is used as the majority (dry weight basis) of the source of carbon and hydrogen.

24. A process according to claim 23, wherein the source of carbon and hydrogen used produces in the reactor a char with an average diameter within the range of about 3 mm to about 9 mm.

25. A process according to claim 13, wherein, in step (h), the adjusting is done to help keep the post-combustion degree in the offgas within the range of approximately 30% to approximately 50% when coal is used as the majority (dry weight basis) of the source of carbon and hydrogen, and within the range of approximately 45% to approximately 60% when coke is used as the majority (dry weight basis) of the source of carbon and hydrogen.

26. A process according to claim 25, wherein the source of carbon and hydrogen used produces in the reactor a char with an average diameter within the range of about 3 mm to about 9 mm.

* * * * *